US011682810B2

United States Patent
Tashiro et al.

(10) Patent No.: US 11,682,810 B2
(45) Date of Patent: Jun. 20, 2023

(54) POWER STORAGE MODULE

(71) Applicant: Panasonic Intellectual Property Management Co., Ltd., Osaka (JP)

(72) Inventors: Yuichi Tashiro, Kyoto (JP); Toshitaka Kobayashi, Shiga (JP); Yuji Sonoda, Kyoto (JP); Toshiaki Shimizu, Kyoto (JP); Masahiro Nakaji, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 270 days.

(21) Appl. No.: 17/042,065

(22) PCT Filed: Mar. 26, 2019

(86) PCT No.: PCT/JP2019/013046
§ 371 (c)(1),
(2) Date: Sep. 25, 2020

(87) PCT Pub. No.: WO2019/189280
PCT Pub. Date: Oct. 3, 2019

(65) Prior Publication Data
US 2021/0013463 A1 Jan. 14, 2021

(30) Foreign Application Priority Data

Mar. 27, 2018 (JP) .............................. JP2018-060040
Mar. 30, 2018 (JP) .............................. JP2018-069678

(51) Int. Cl.
*H01M 50/213* (2021.01)
*H01M 50/296* (2021.01)
*H01M 10/04* (2006.01)
(52) U.S. Cl.
CPC ..... *H01M 50/213* (2021.01); *H01M 10/0422* (2013.01); *H01M 50/296* (2021.01)

(58) Field of Classification Search
CPC .................. H01M 50/213; H01M 10/0422
See application file for complete search history.

(56) References Cited

U.S. PATENT DOCUMENTS

2009/0258282 A1     10/2009   Harada et al.
2012/0082887 A1 *    4/2012   Ninomiya .......... H01M 10/643
                                                       361/434

(Continued)

FOREIGN PATENT DOCUMENTS

CN      101552351 A      10/2009
JP      H06-140023 A      5/1994

(Continued)

OTHER PUBLICATIONS

Chinese Office Action issued in corresponding Chinese Patent Application No. 201980021209.7 dated May 31, 2022, with English translation of the cover pages and search report.

(Continued)

*Primary Examiner* — Jane J Rhee
(74) *Attorney, Agent, or Firm* — McDermott Will & Emery LLP

(57) ABSTRACT

This power storage module includes power storage devices (100), and a device holder (200) in which the power storage devices (100) are held. The device holder (200) includes accommodation parts (210) in which the power storage devices (100) are accommodated. Each accommodation part (210) includes a semicircular arc face (212) to which a peripheral face of the power storage device (100) is opposed, and linear faces (213) respectively continuous with both ends of the semicircular arc face (212) and each extending to an opening end of the accommodation part (210). Further, the power storage module includes an elastic adhesive (250) filled, in each accommodation part (210), between the peripheral face of the power storage device (100) and each (Continued)

linear face (213), and adhered to the peripheral face of the power storage device (100) and the linear face (213).

19 Claims, 13 Drawing Sheets

(56) References Cited

U.S. PATENT DOCUMENTS

| | | |
|---|---|---|
| 2016/0226054 A1 | 8/2016 | Kusama et al. |
| 2017/0108028 A1 | 4/2017 | Yamauchi et al. |
| 2017/0278645 A1 | 9/2017 | Wakinaka et al. |

FOREIGN PATENT DOCUMENTS

| | | | |
|---|---|---|---|
| JP | H11-045691 A | 2/1999 | |
| JP | 2011-009477 A | 1/2011 | |
| JP | 4635288 B2 * | 2/2011 | ............... B60K 6/28 |
| JP | 2012-074535 A | 4/2012 | |
| JP | 2015-207437 A | 11/2015 | |
| JP | 2016-143466 A | 8/2016 | |
| WO | 2015/146096 A1 | 10/2015 | |
| WO | 2016/110886 A1 | 7/2016 | |
| WO | 2017/130260 A1 | 8/2017 | |

OTHER PUBLICATIONS

International Search Report issued in corresponding International Patent Application No. PCT/JP2019/013046, dated May 28, 2019, with English translation.

Chinese Office Action issued in corresponding Chinese Patent Application No. 201980021209.7, dated Nov. 18, 2022, with English translation.

Japanese Office Action issued in corresponding Japanese Patent Application No. 2020-510976, dated Apr. 25, 2023, with English translation.

* cited by examiner

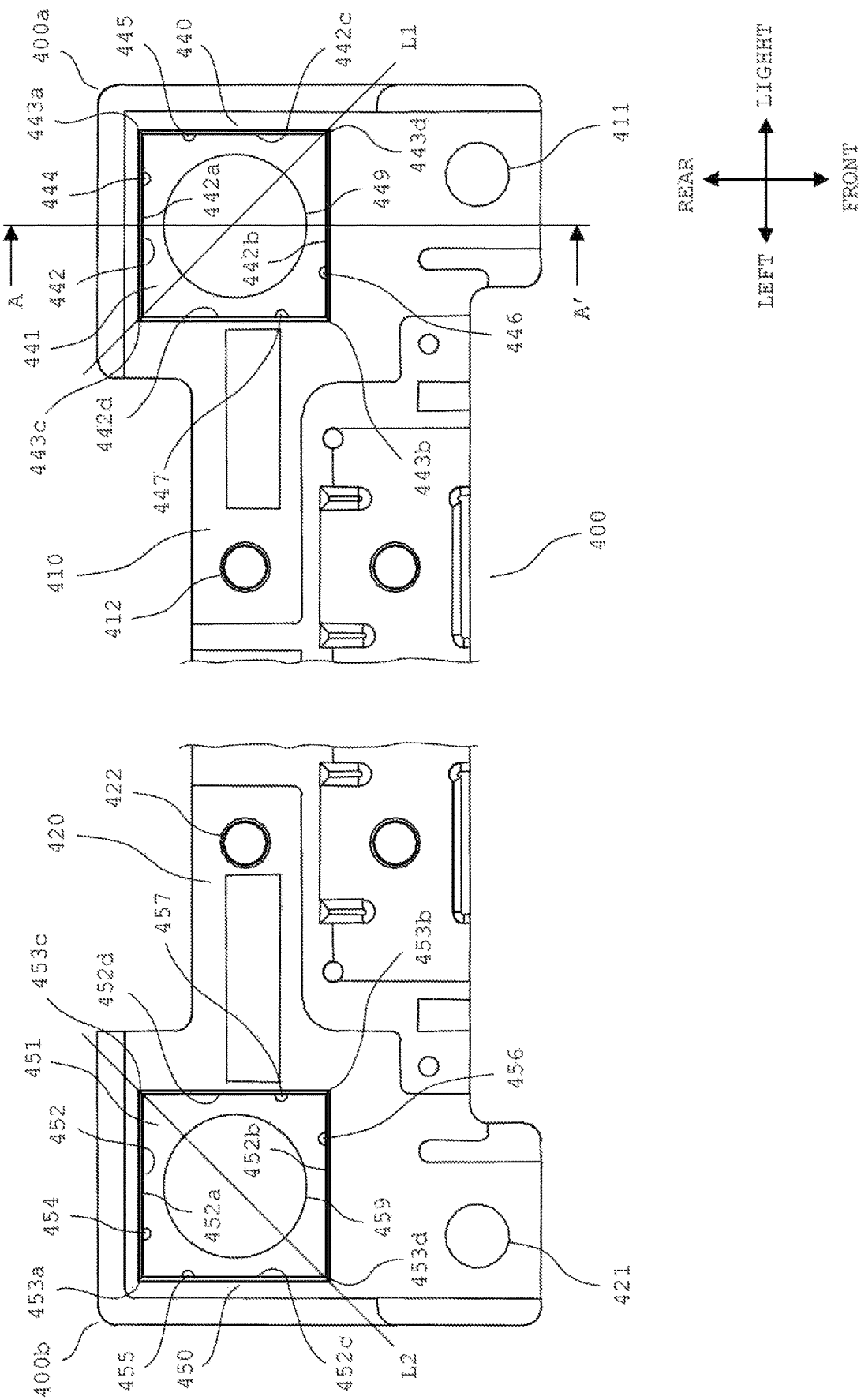

POWER STORAGE MODULE

CROSS-REFERENCE OF RELATED APPLICATIONS

This application is the U.S. National Phase under 35 U.S.C. § 371 of International Patent Application No. PCT/JP2019/013046, filed on Mar. 26, 2019, which in turn claims the benefit of Japanese Application No. 2018-060040, filed on Mar. 27, 2018 and Japanese Application No. 2018-069678, filed on Mar. 30, 2018, the entire disclosures of which Applications are incorporated by reference herein.

TECHNICAL FIELD

The present invention relates to a power storage module.

BACKGROUND ART

A power storage unit formed by a plurality of power storage devices is known (for example, see Patent Literature 1). The power storage unit includes a holder that includes: receiving chambers for receiving the plurality of power storage devices; fixing claws extending from the opening end of each receiving chamber; and a fixing claw formed at the bottom of the receiving chamber. The peripheral face of each power storage device is held by the fixing claws at the opening end and the fixing claw at the bottom, whereby the plurality of power storage devices are held in the holder.

CITATION LIST

Patent Literature

[PTL 1] International Publication No. WO2016/110886

SUMMARY OF THE INVENTION

Problems to be Solved by the Invention

In the above power storage unit, as for the holder, the rigidity on the side of the face having the opening end of each receiving chamber tends to be low. When the power storage unit vibrates, in particular, resonates, in a direction parallel to the direction in which the receiving chamber is open, the holder is easily deformed in this direction.

In view of the above problem, an object of the present invention is to provide a power storage module in which a holder has an increased rigidity on the side where an accommodation part is open, whereby the holder is less likely to be deformed in a direction parallel to the direction in which the accommodation part is open.

Solution to the Problems

A power storage module according to a main aspect of the present invention includes a power storage device and a holder in which the power storage device is held. Here, the holder includes an accommodation part in which the power storage device is accommodated, and the accommodation part includes a first wall face to which a peripheral face of the power storage device is opposed, and second wall faces respectively continuous with both ends of the first wall face and each extending to an opening end of the accommodation part. Further, the power storage module includes an adhesive filled, in the accommodation part, between the peripheral face of the power storage device and each second wall face, the adhesive being adhered to the peripheral face of the power storage device and the second wall face.

It is noted that, in the claims, the term "fill" can be construed to have a broad meaning including a case where an adhesive is present across the peripheral face of the power storage device and the second wall face.

Advantageous Effects of the Invention

According to the present invention, the rigidity of the holder on the side where the accommodation part is open is increased. Thus, it is possible to provide the power storage module in which the holder is less likely to be deformed in a direction parallel to the direction in which the accommodation part is open.

The effects and the significance of the present invention will be further clarified by the description of the embodiment below. However, the embodiment below is merely an example for implementing the present invention. The present invention is not limited to the embodiment below in any way.

BRIEF DESCRIPTION OF THE DRAWINGS

FIG. 12 is a plan view of the terminal holder, with a center portion omitted, according to Modification 2.

Figure 1:
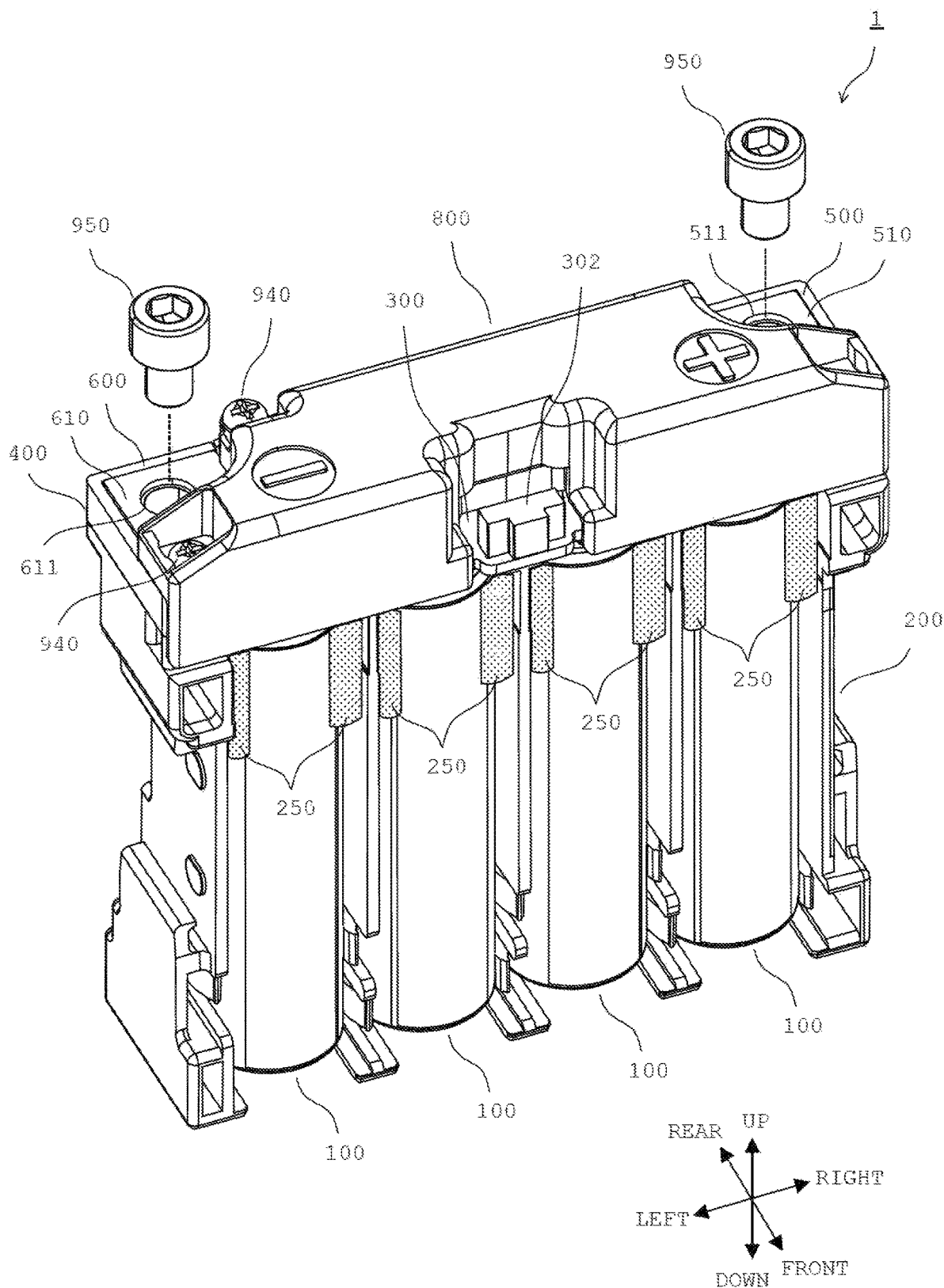
FIG. 1 is a perspective view of a power storage module according to an embodiment.

It is noted that the drawings are solely for description and do not limit the scope of the present invention in any way.

BEST MODE FOR CARRYING OUT THE INVENTION

In the following, a power storage module 1 according to the present embodiment will be described with reference to the drawings. For convenience, front, rear, left, right, up, and down directions are indicated in the drawings, as appropriate. It is noted that the directions in the drawings merely indicate relative directions with respect to the power storage module 1, and do not denote absolute directions.

In the present embodiment, a positive electrode lead terminal 140 and a negative electrode lead terminal 150 correspond to "lead terminal" described in the claims. A device holder 200 corresponds to "holder" described in the claims. A semicircular arc face 212 corresponds to "first wall face" described in the claims. A linear face 213 corresponds to "second wall face" described in the claims. An elastic adhesive 250 corresponds to "adhesive" described in the claims. A circuit board 300 corresponds to "connection member" described in the claims.

However, the above description is merely for providing correspondence between the configurations described in the claims and configurations of the embodiment. The above correspondence does not limit the invention described in the claims to the configurations of the embodiment in any way.

Figure 2:
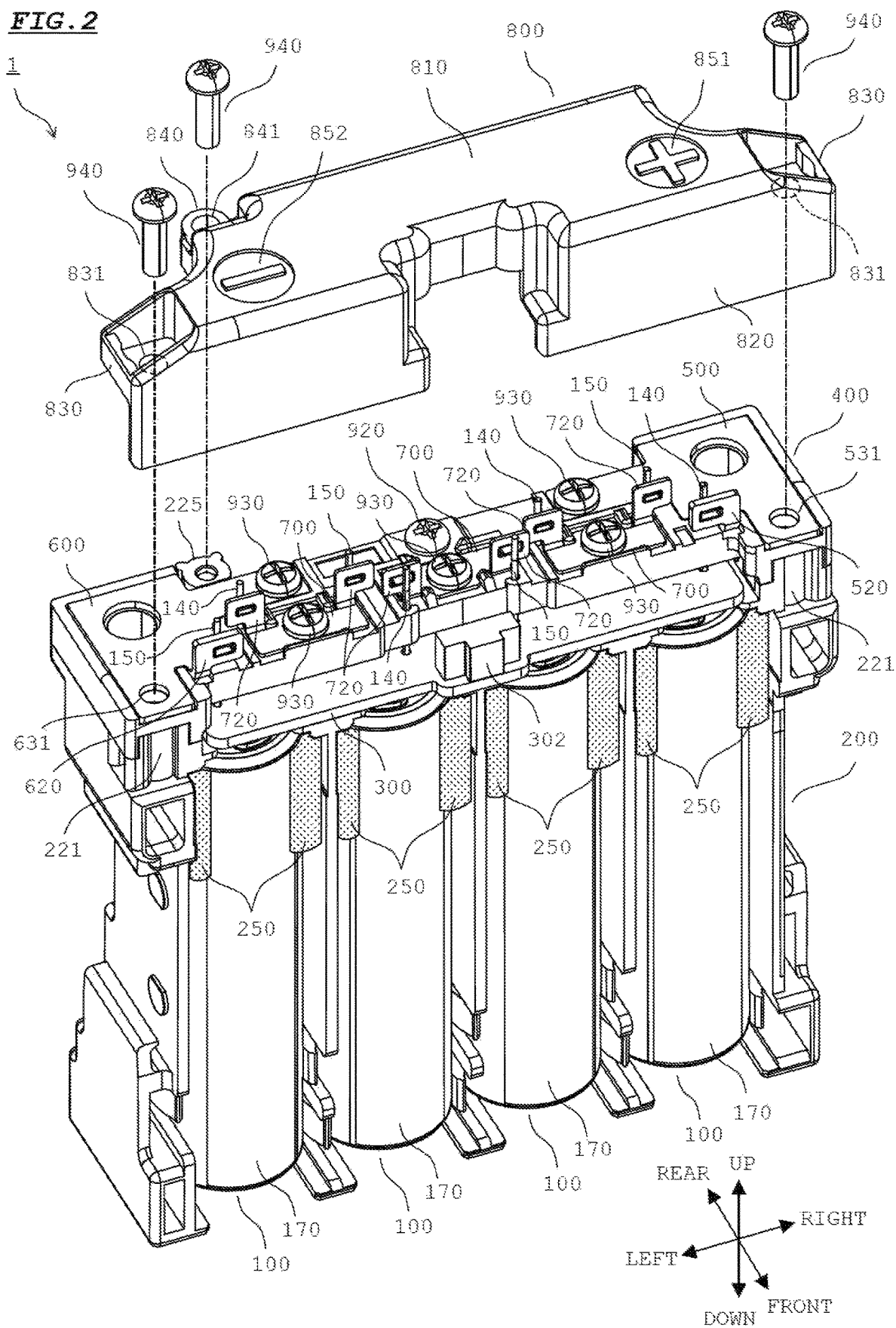
FIG. 2 is a perspective view of the power storage module in a state where a terminal cover is removed, according to the embodiment.
Figure 3:
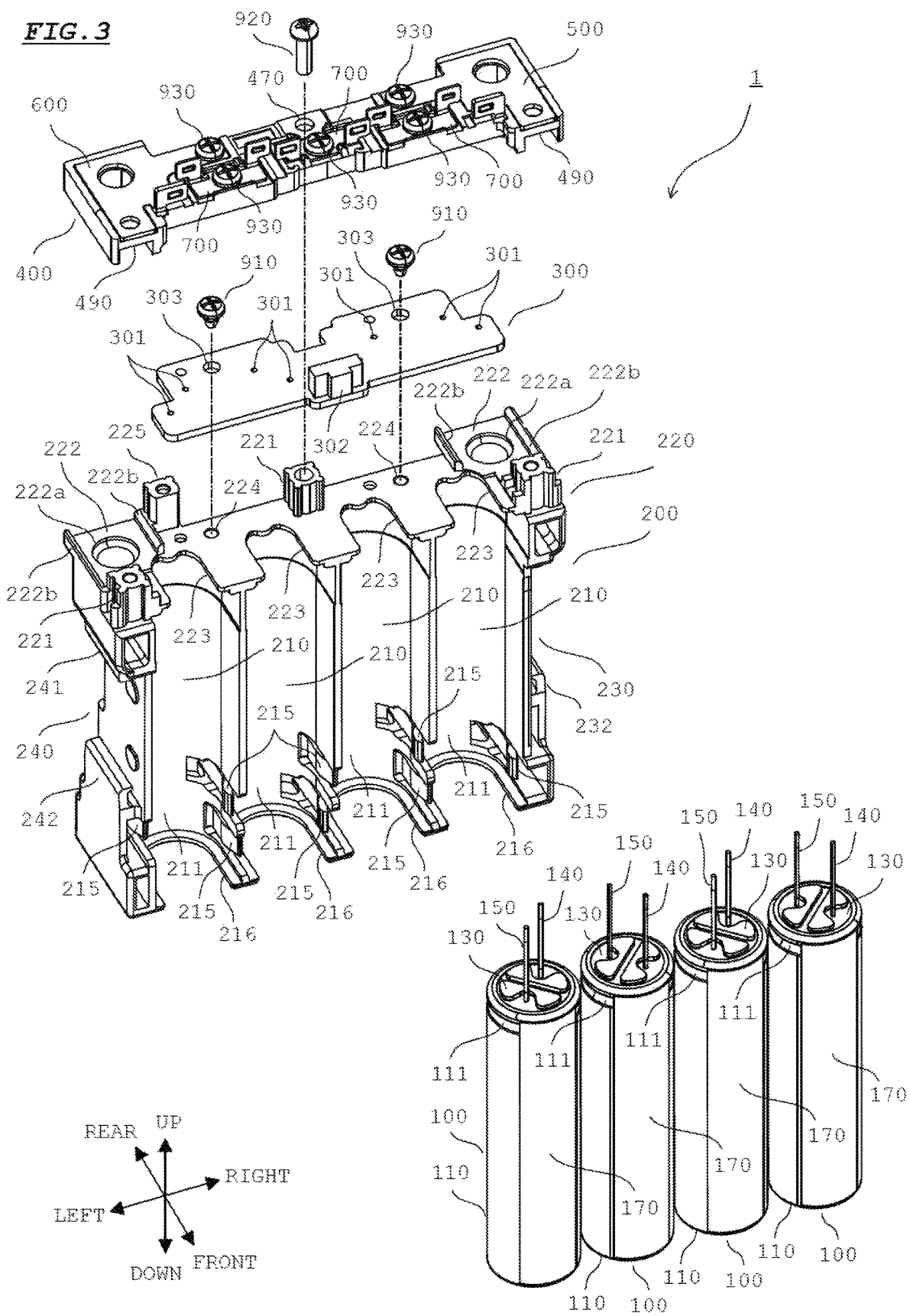
FIG. 3 is an exploded perspective view of the power storage module, without the terminal cover, according to the embodiment.
Figure 4:
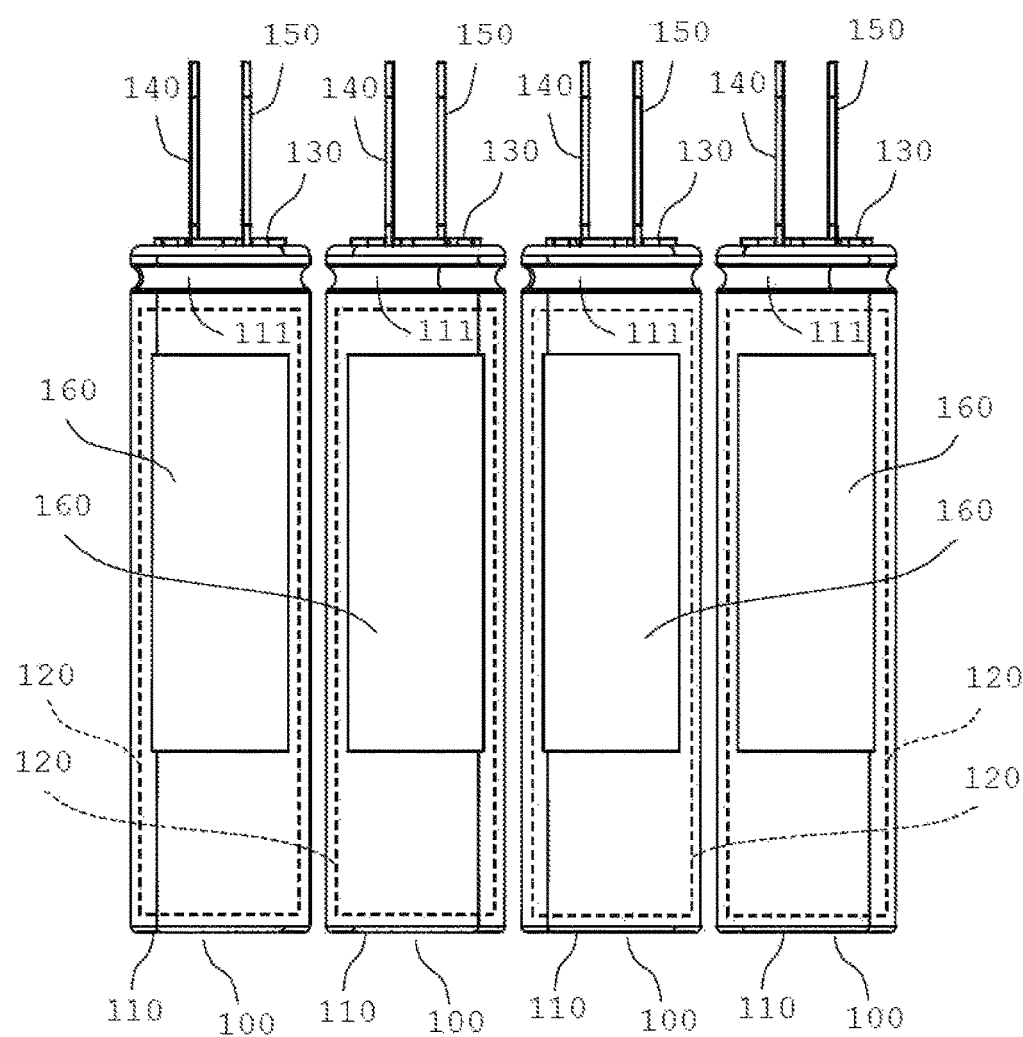
FIG. 4 shows four power storage devices, viewed from a device holder side shown in FIG. 3, according to the embodiment.
Figure 5A:
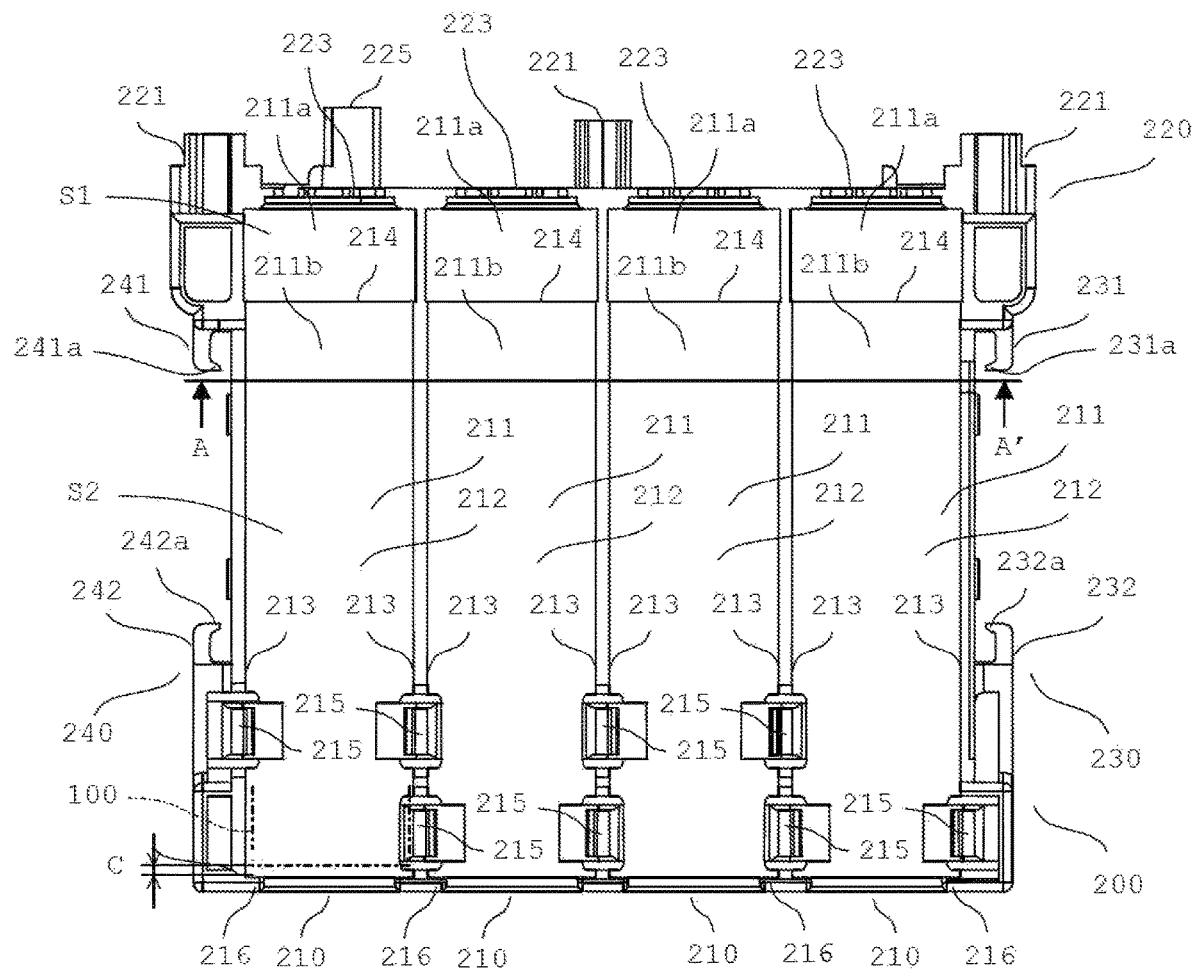
FIG. 5A is a front view of the device holder according to the embodiment.
Figure 5B:
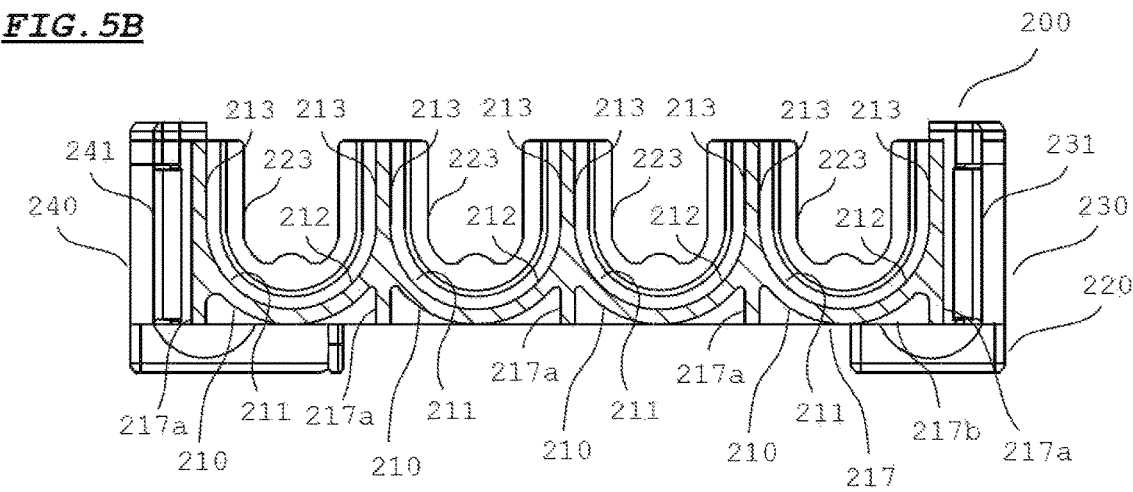
FIG. 5B is an A-A' cross-sectional view of FIG. 5A.
Figure 6:
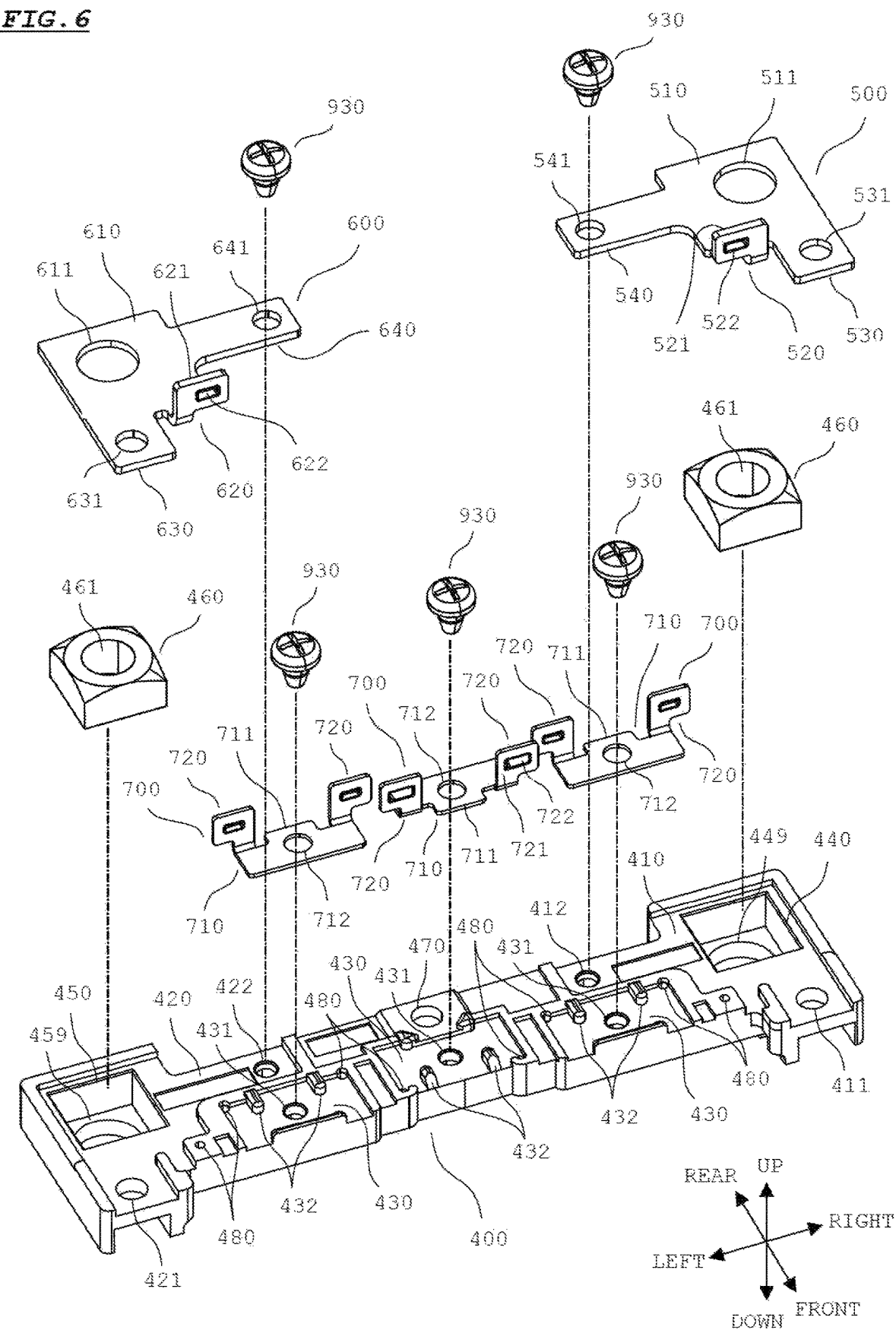
FIG. 6 is an exploded perspective view of a terminal holder, a first external output terminal, a second external output terminal, and relay connection terminals, according to the embodiment.
Figure 7:
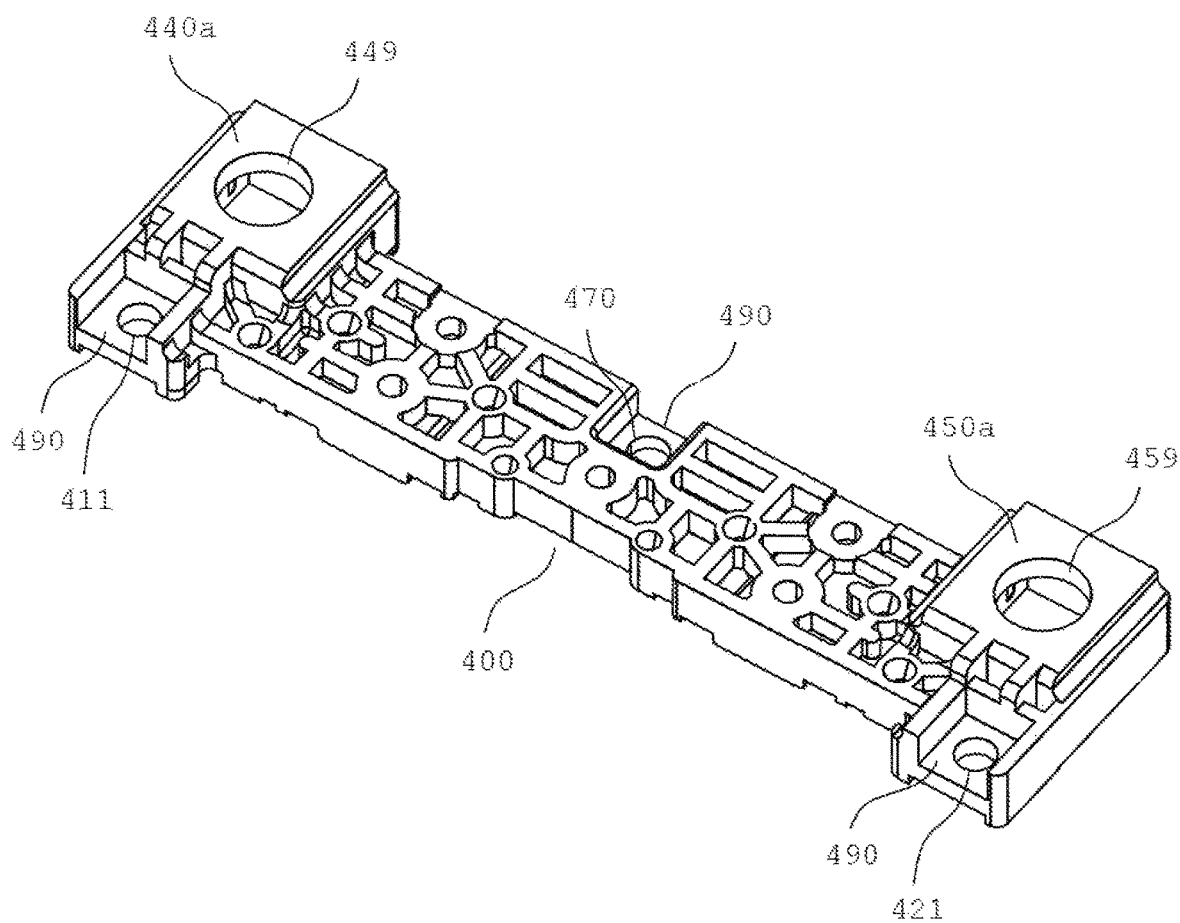
FIG. 7 is a perspective view of the terminal holder in a reversed state, according to the embodiment.

FIG. 1 is a perspective view of the power storage module 1 according to the present embodiment. FIG. 2 is a perspective view showing the power storage module 1 in a state where a terminal cover 800 is removed, according to the present embodiment. FIG. 3 is an exploded perspective view of the power storage module 1, without the terminal cover 800, according to the present embodiment. FIG. 4 shows four power storage devices 100, viewed from the device holder 200 side shown in FIG. 3, according to the present embodiment. FIG. 5A is a front view of the device holder 200 according to the present embodiment, and FIG. 5B is an A-A' cross-sectional view of FIG. 5A. FIG. 6 is an exploded perspective view of a terminal holder 400, a first external output terminal 500, a second external output terminal 600, and relay connection terminals 700, according to the present embodiment. FIG. 7 is a perspective view of the terminal holder 400 in a reversed state, according to the present embodiment.

The power storage module 1 includes four cylindrical power storage devices 100, the device holder 200, the circuit board 300, the terminal holder 400, the first external output terminal 500, the second external output terminal 600, and three relay connection terminals 700, and the terminal cover 800. In addition, the power storage module 1 includes: screws 910 to be used for fixing the circuit board 300; a screw 920 to be used for fixing the terminal holder 400; five screws 930 to be used for fixing the first external output terminal 500, the second external output terminal 600, and the three relay connection terminals 700; three screws 940 to be used for fixing the terminal cover 800; and bolts 950 to be used when connecting external terminals (not shown) to the first external output terminal 500 and the second external output terminal 600. Two of the three screws 940 also serve as screws for fixing the terminal holder 400, the first external output terminal 500, and the second external output terminal 600.

Examples of the power storage device 100 include a lithium ion secondary battery in which an active material of the positive electrode is a lithium transition metal oxide such as lithium cobaltate and an active material of the negative electrode is a carbon material. Not limited to a nonaqueous electrolyte secondary battery, the power storage device 100 may be a secondary battery other than a nonaqueous electrolyte secondary battery, or may be a primary battery.

The power storage device 100 may be a capacitor such as a lithium ion capacitor. A power storage device 100 in which a conductive polymer is used as an active material of the positive electrode may be adopted. Examples of the conductive polymer include polyaniline, polypyrrole, or polythiophene, derivatives thereof, and the like. A plurality of types of conductive polymers may be used.

Each power storage device 100 includes: a container 110 having a bottomed slender cylindrical shape and made of metal, e.g., aluminium; a device element 120 accommodated in the container 110; a sealing body 130 sealing an opening of the container 110; and a positive electrode lead terminal 140 and a negative electrode lead terminal 150 which are drawn from the sealing body 130 to the outside. Each power storage device 100 includes a nonaqueous electrolytic solution (not shown).

The device element 120 is formed by winding a positive electrode and a negative electrode with a separator provided therebetween. The device element 120 can be of a laminated type instead of the wound type as described above.

The sealing body 130 is formed from an elastic material that includes a rubber component, for example, and closes the opening of the container 110 so as to prevent leakage of the nonaqueous electrolytic solution filled in the container 110. The positive electrode lead terminal 140 is electrically connected to the positive electrode of the device element 120. The negative electrode lead terminal 150 is electrically connected to the negative electrode of the device element 120. Electric power is extracted from the power storage device 100 to the outside through the positive electrode lead terminal 140 and the negative electrode lead terminal 150.

The opening end portion of the container 110 is subjected to narrowing processing in order to fix the sealing body 130. Accordingly, the peripheral face of the container 110 has formed therein a narrowed part 111 in which a portion, around the outer periphery of the sealing body 130, of the peripheral face of the container 110 is inwardly narrowed. The peripheral face of the container 110 serves as the peripheral face of the power storage device 100. When the power storage device 100 is covered by a protection tape 170, the protection tape 170 also serves as the peripheral face of the power storage device 100.

A double-sided adhesive tape 160 is affixed to each power storage device 100, before the power storage device 100 is attached to the device holder 200. The double-sided adhesive tape 160 has a rectangular shape of a predetermined size. As shown in FIG. 4, the double-sided adhesive tape 160 is affixed to the peripheral face of the power storage device 100, on a half-face side opposed to the device holder 200, at a position lower than the narrowed part 111. The double-sided adhesive tape 160 is configured as an acrylic adhesive in a sheet shape, for example, and does not include a base material such as a nonwoven fabric, or a resin film such as cellophane, polypropylene, acrylic, or polyethylene terephthalate. Preferably, the thickness of the double-sided adhesive tape 160 is about 50 μm to 200 μm, for example.

With respect to the peripheral face of each power storage device 100, a half-face side that is not opposed to the device holder 200 is covered, from the upper end to the lower end, by the protection tape 170. The protection tape 170 is formed from a material having insulating properties, such as paper. The protection tape 170 is useful when the container 110 has a function for drawing an electrode. That is, when the portion, exposed from the device holder 200, of the peripheral face of the power storage device 100 is covered by the protection tape 170, a metal-made member is prevented from coming into direct contact with the exposed portion. Thus, for example, occurrence of a short circuit or the like between different power storage devices 100 is prevented.

The device holder 200 is formed from a resin material such as a thermoplastic resin or a thermosetting resin. Examples of the thermoplastic resin include polyphenylene sulfide (PPS), polybutylene terephthalate (PBT), and the like. Examples of the thermosetting resin include epoxy compound, phenol resin, urea resin, polyimide, polyurethane, diallyl phthalate, unsaturated polyester, and the like. A filler, a softener, or the like may be included in addition to the resin material. As the filler, for example, insulating particles and/or fibers are preferable. Examples of the insulating material as the filler include compounds (e.g., oxides) that have insulating properties such as silica and alumina, and inorganic materials such as glass, mineral materials (e.g., talc, mica, clay). The device holder 200 may include one type of these fillers, or may include a combination of two or more types of these fillers. The content of the filler in the device holder 200 is 10 to 90 mass %, for example. In order to enhance heat resistance, an additive may be added to the device holder 200. When a hardening resin is used as the resin material, a hardener, a polymerization initiator, a catalyst, or the like may be added as appropriate in accordance with the type of the hardening resin.

The device holder 200 includes four accommodation parts 210 continuous in the left-right direction, in order to hold the four power storage devices 100 in a state of being arranged in the left-right direction. Each accommodation part 210 is formed in a slender tubular shape that has both ends open and that has a U-shaped cross-section, so as to be able to accommodate substantially the entirety of the power storage device 100 from the front side. An inner face 211 of each accommodation part 210 includes: a face 212 having a semicircular arc shape (hereinafter, referred to as "semicircular arc face 212"); and faces 213 extending from both ends of the semicircular arc face 212 to the opening end and each having a linear shape (hereinafter, referred to as "linear face 213"). When setting the diameter of the semicircular arc face 212, the outer diameter of the power storage device 100 and the thickness of the double-sided adhesive tape 160 are taken into consideration. For example, the diameter of the semicircular arc face 212 is set to be greater than the outer diameter of the power storage device 100 by the thickness of the double-sided adhesive tape 160.

The inner face 211 of each accommodation part 210 includes a first region 211a present in an upper end portion of the accommodation part 210, and a second region 211b that is a region other than the first region 211a. A step 214 is formed between the first region 211a and the second region 211b such that an accommodation space S1 of the accommodation part 210 in the first region 211a is greater than an accommodation space S2 of the accommodation part 210 in the second region 211b.

As for each accommodation part 210, a pair of claw parts 215 are provided at a lower portion thereof. Each claw part 215 is formed at a portion of each of the linear face 213 on both left and right sides, is curved so as to have the same curvature as the semicircular arc face 212, and protrudes toward the inner side of the accommodation part 210. With respect to adjacent two accommodation parts 210, the positions of the pair of claw parts 215 in the upper portion and the lower portion are shifted in the up-down direction. Accordingly, the device holder 200 can have a shape in which the side face portions of adjacent accommodation parts 210 are shared. Thus, the size in the left-right direction of the device holder 200 can be reduced.

In each accommodation part 210, a rib 216 in a U-shape for reinforcing the accommodation part 210 is formed at the bottom face thereof. As indicated by the chain line in FIG. 5A, in a state where the power storage device 100 is accommodated in the accommodation part 210, a clearance C is provided between the rib 216 and the bottom face of the power storage device 100. Accordingly, even when gas is generated in the power storage device 100 due to aged deterioration, the internal pressure is increased, and the bottom face of the power storage device 100 bulges downwardly, the bulged bottom face of the power storage device 100 is less likely to come into contact with the rib 216, and damages and the like are less likely to be caused in the rib 216. A rib group 217 in a lattice shape composed of a plurality of ribs 217a extending in the up-down direction and a plurality of ribs 217b extending in the left-right direction is formed on the back side of the five accommodation parts 210, i.e., on the rear face of the device holder 200. The rear face side of the device holder 200 is reinforced by the rib group 217.

In the device holder 200, above the four accommodation parts 210, a mounting plate 220 that has a substantially rectangular shape and to which the circuit board 300 and the terminal holder 400 are to be mounted is provided integrally with the four accommodation parts 210. In the mounting plate 220, mounting bosses 221 for mounting the terminal holder 400 are formed in a corner portion on the left front side, a corner portion on the right front side, and a rear portion at the center. Each mounting boss 221 is formed in a cylindrical shape that has four protruding ribs formed on the periphery thereof. In the mounting plate 220, placement parts 222 on which back side portions 440a, 450a of a first recessed portion 440 and a second recessed portion 450 of the terminal holder 400 are placed, are provided at the rear of the left and right mounting bosses 221. In each placement part 222, a circular recessed portion 222a is formed in a center portion thereof, and ribs 222b extending in the front-rear direction are formed in both of left and right end portions thereof. Further, in the mounting plate 220, an opening portion 223 is formed above each accommodation part 210. The front side of each opening portion 223 is open such that the positive electrode lead terminal 140 and the negative electrode lead terminal 150 of the power storage device 100 can be inserted from the front. Further, in the mounting plate 220, mounting holes 224 for mounting the circuit board 300 are formed at the left and right of the mounting boss 221 in the center rear portion. Further, in the mounting plate 220, a mounting boss 225 for mounting the terminal cover 800 is formed at the right of the left placement part 222. The mounting boss 225 is formed in a cylindrical shape that has two protruding ribs an the periphery thereof.

A first coupling part 230 and a second coupling part 240, to be used when two power storage modules 1 are to be coupled in the left-right direction, are respectively provided at the right side face and the left side face of the device holder 200. The first coupling part 230 and the second coupling part 240 include upper claw parts 231, 241 positioned on the upper side, and lower claw parts 232, 242 positioned on the lower side. The upper claw parts 231, 241 extend downwardly and have, at the leading end portions thereof, protrusions 231a, 241a protruding toward the side-face sides of the device holder 200. The lower claw parts 232, 242 extend upwardly, and have, at the leading end portions thereof, protrusions 232a, 242a protruding toward the side-face sides of the device holder 200. Two power storage modules 1 are arranged such that the first coupling part 230 and the second coupling part 240 are adjacent to each other, and the first coupling part 230 and the second coupling part 240 are coupled by a coupling plate (not shown). Accordingly, the two power storage modules 1 are coupled. Two or more power storage modules 1 are coupled, whereby a power storage unit is formed.

The circuit board 300 has a shape that is long in the left-right direction (the array direction of the power storage devices 100). Pairs of through-holes 301 are formed in the circuit board 300. The positive electrode lead terminal 140 and the negative electrode lead terminal 150 of each power storage device 100 are passed through a corresponding pair of through-holes 301 and electrically connected thereto. The inside of each through-hole 301 is metal-plated. On the circuit board 300, an electronic circuit part (not shown) is disposed in addition to a connector 302. The electronic circuit part includes a voltage detection circuit which detects the voltage of each power storage device 100, and a balancing circuit for balancing the voltage of each power storage device 100 in accordance with the voltage detected by the voltage detection circuit. Each pair of through-holes 301 are connected to the electronic circuit part through a conductive pattern (not shown). Further, the circuit board 300 has formed therein two insertion holes 303 through which the screws 910 are passed.

The terminal holder 400 holds the first external output terminal 500, the second external output terminal 600, and the three relay connection terminals 700. The terminal holder 400 is formed from a resin material similar to that for the device holder 200, such as a thermoplastic resin or a thermosetting resin. The terminal holder 400 is formed in a substantially rectangular parallelepiped shape that is thin in the up-down direction and that is long in the left-right direction (the array direction of the power storage devices 100), and has front and rear corner portions at each of a left end portion and a right end portion.

In the terminal holder 400, a first terminal mounting part 410, a second terminal mounting part 420, and three third terminal mounting parts 430 are formed on the surface (upper face) thereof, which serves as the attachment face for the first external output terminal 500, the second external output terminal 600, and the relay connection terminals 700. The first terminal mounting part 410 is an attachment region for the first external output terminal 500, is formed in a right end portion of the terminal holder 400, has a shape corresponding to the shape of the first external output terminal 500, and is recessed by the thickness of the first external output terminal 500 with respect to the surface of the terminal holder 400. The second terminal mounting part 420 is an attachment region for the second external output terminal 600, is formed in a left end portion of the terminal holder 400, has a shape corresponding to the shape of the second external output terminal 600, and is recessed by the thickness of the second external output terminal 600 with respect to the surface of the terminal holder 400. The three third terminal mounting parts 430 are formed so as to be arranged in the left-right direction between the first terminal mounting part 410 and the second terminal mounting part 420, each have a rectangular shape, and each is recessed by the thickness of the relay connection terminal 700 with respect to the surface of the terminal holder 400.

In the first terminal mounting part 410, the first recessed portion 440 having a quadrangular shape is formed so as to be close to the corner portion on the rear side of the right end portion of the terminal holder 400. In the second terminal mounting part 420, the second recessed portion 450 having a quadrangular shape is formed so as to be close to the corner portion on the rear side of the left end portion of the terminal holder 400. Circular opening portion 449, 459 are provided in the bottom faces of the first recessed portion 440 and the second recessed portion 450. Quadrangular nuts 460 made of metal are embedded in the first recessed portion 440 and the second recessed portion 450. A bolt hole 461 is formed in a center portion of each nut 460.

A first insertion hole 411 and a first mounting hole 412 for fixing the first external output terminal 500 to the terminal holder 400 are formed in the first terminal mounting part 410. A screw 940 to be fastened to the right mounting boss 221 is passed through the first insertion hole 411. A screw 930 is fastened to the first mounting hole 412. Similarly, a second insertion hole 421 and a second mounting hole 422 for fixing the second external output terminal 600 to the terminal holder 400 are formed in the second terminal mounting part 420. A screw 940 to be fastened to the left mounting boss 221 is passed through the second insertion hole 421. A screw 930 is fastened to the second mounting hole 422.

Third mounting holes 431 for fixing the relay connection terminals 700 to the terminal holder 400 are formed in the three third terminal mounting parts 430. The first mounting hole 412 of the first terminal mounting part 410 is formed at the same position in the left-right direction as the third mounting hole 431 of the right third terminal mounting part 430. The second mounting hole 422 of the second terminal mounting part 420 is formed at the same position in the left-right direction as the third mounting hole 431 of the left third terminal mounting part 430. A pair of ribs 432 are formed in each of the three third terminal mounting parts 430. In the right and left third terminal mounting parts 430, the pair of ribs 432 are provided in a rear portion thereof. In the center third terminal mounting part 430, the pair of ribs 432 are provided in a front portion thereof.

Further, in the terminal holder 400, a third insertion hole 470 for fixing the terminal holder 400 to the device holder 200 is formed at a position at the rear of the center third terminal mounting part 430. The screw 920 to be fastened to the center mounting boss 221 is passed through the third insertion hole 470. The first insertion hole 411 of the first terminal mounting part 410 and the second insertion hole 421 of the second terminal mounting part 420 are also used for fixing the terminal holder 400 to the device holder 200, similar to the third insertion hole 470.

Further, in the terminal holder 400, a pair of terminal insertion hole 480 through which the positive electrode lead terminal 140 and the negative electrode lead terminal 150 of each power storage device 100 are passed are formed between two terminal mounting parts among the first terminal mounting part 410, the second terminal mounting part 420, and the third terminal mounting parts 430.

On the back face of the terminal holder 400, boss receiving parts 490 recessed in shapes corresponding to the mounting bosses 221 are formed at the positions of the first insertion hole 411, the second insertion hole 421, and the third insertion hole 470. The back side portion 440a of the first recessed portion 440 and the back side portion 450a of the second recessed portion 450 protrude downwardly with respect to the other portions.

Each of the first external output terminal 500, the second external output terminal 600, and the three relay connection terminals 700 is formed by cutting out a conductive metal plate, e.g., a copper plate, into a predetermined shape, and bending the cut-out plate. The first external output terminal 500 and the second external output terminal 600 are terminals for outputting, to the outside, electric power extracted from the four power storage devices 100. External terminals (not shown) prepared in an external apparatus to which electric power is supplied are connected to the first external output terminal 500 and the second external output terminal 600. In the present embodiment, the first external output terminal 500 serves as the output terminal on the positive electrode side, and the second external output terminal 600 serves as the output terminal on the negative electrode side. The three relay connection terminals 700 connect the four power storage devices 100 in series between the first external output terminal 500 and the second external output terminal 600.

The first external output terminal 500 includes an external connection terminal part 510, a lead terminal connection part 520, a first fixation part 530, and a second fixation part 540. The external connection terminal part 510 is formed in a substantially square shape, and has an insertion hole 511 through which a bolt 950 is passed. The lead terminal connection part 520 is provided on the front side of the external connection terminal part 510. The lead terminal connection part 520 is formed so as to stand substantially perpendicular with respect to the external connection terminal part 510, and extends along the extending direction in which the positive electrode lead terminal 140 and the negative electrode lead terminal 150 extend from the power storage device 100. A center portion of a connection face 521 of the lead terminal connection part 520 bulges toward the external connection terminal part 510 side, thereby forming a projection 522. The first fixation part 530 extends forward from the external connection terminal part 510 at the right side relative to the lead terminal connection part 520. The first fixation part 530 has, at a leading end portion thereof, an insertion hole 531 through which a screw 940 is passed. The second fixation part 540 extends leftward from the external connection terminal part 510. The second fixation part 540 has, at a leading end portion thereof, an insertion hole 541 through which a screw 930 is passed.

The second external output terminal 600 has a shape obtained by inversing the first external output terminal 500 in the left-right direction. The second external output terminal 600 includes an external connection terminal part 610, a lead terminal connection part 620, a first fixation part 630, and a second fixation part 640. An insertion hole 611 through which a bolt 950 is passed is formed in the external connection terminal part 610. A projection 622 is formed on a connection face 621 of the lead terminal connection part 620. The first fixation part 630 has, at a leading end portion thereof, an insertion hole 631 through which a screw 940 is passed. The second fixation part 640 has, at a leading end portion thereof, an insertion hole 641 through which a screw 930 is passed.

Each relay connection terminal 700 includes a terminal body part 710 and two lead terminal connection parts 720. A center portion of the terminal body part 710 has an increased width in the front-rear direction thereof, and a fixation part 711 having an insertion hole 712 is formed in the center portion. The lead terminal connection parts 720 are formed so as to stand substantially perpendicular with respect to the terminal body part 710, at both end portions in the left-right direction of the terminal body part 710 and at one edge in the front-rear direction. The lead terminal connection parts 720 extend along the extending direction of the positive electrode lead terminal 140 and the negative electrode lead terminal 150. A center portion of a connection face 721 of each lead terminal connection part 720 bulges toward a side opposite to the terminal body part 710, thereby forming a projection 722.

In the terminal holder 400, the first external output terminal 500 is fixed by a screw 930 to the first terminal mounting part 410 in which a nut 460 has been embedded in the first recessed portion 440. At this time, the first external output terminal 500 is received in the recessed first terminal mounting part 410. Then, a screw 930 is passed through the insertion hole 541 of the second fixation part 540, and is fastened into the first mounting hole 412. The first terminal mounting part 410 is formed in a shape of the first external output terminal 500. In the first external output terminal 500 fitted in the first terminal mounting part 410, movements in the front-rear and left-right directions, i.e., in directions along the surface of the terminal holder 400, are restricted. Thus, when the screw 930 is to be fastened or when the screw 930 has been loosened, the first external output terminal 500 is less likely to move in the front-rear and left-right directions. In a state where the first external output terminal 500 is fixed to the first terminal mounting part 410, the first external output terminal 500 covers the nut 460 from above, and the insertion hole 511 of the external connection terminal part 510 is aligned with the bolt hole 461 of the nut 460.

Similarly, the second external output terminal 600 is fixed by a screw 930 to the second terminal mounting part 420 in which a nut 460 has been embedded in the second recessed portion 450. At this time, the second external output terminal 600 is received in the recessed second terminal mounting part 420. Then, a screw 930 is passed through the insertion hole 641 of the second fixation part 640, and is fastened into the second mounting hole 422. The second terminal mounting part 420 is formed in a shape of the second external output terminal 600. In the second external output terminal 600 fitted in the second terminal mounting part 420, movements in the front-rear and left-right directions are restricted. Thus, when the screw 930 is to be fastened or when the screw 930 has been loosened, the second external output terminal 600 is less likely to move in the front-rear and left-right directions. In a state where the second external output terminal 600 is fixed to the second terminal mounting part 420, the second external output terminal 600 covers the nut 460 from above, and the insertion hole 611 of the external connection terminal part 610 is aligned with the bolt hole 461 of the nut 460.

Similarly, each relay connection terminal 700 is fixed by a screw 930 to a corresponding third terminal mounting part 430. At this time, the relay connection terminal 700 is received in the recessed third terminal mounting part 430. Then, a screw 930 is passed through the insertion hole 712 of the fixation part 711, and is fastened into the third mounting hole 431. The third terminal mounting part 430 has a substantially rectangular shape, and the dimensions in the front-rear and left-right directions are respectively substantially equal to the maximum dimensions in the front-rear and left-right directions of the terminal body part 710 of the relay connection terminal 700. Therefore, the relay connection terminal 700 fitted in the third terminal mounting part 430 has movements into the front-rear and left-right directions restricted, and thus, is less likely to move in the front-rear and left-right directions when the screw 930 is to be fastened or when the screw 930 has been loosened. In a state where the second external output terminal 600 is fixed to the second terminal mounting part 420, the center relay connection terminal 700 is fixed in an orientation reversed, in the front-rear direction, to the orientation of the left and right relay connection terminals 700. In a state where the relay connection terminal 700 is fixed to the third terminal mounting part 430, a state is established in which a pair of ribs 432 are interposed between the fixation part 711 of the terminal body part 710 and the lead terminal connection parts 720 in the relay connection terminal 700. Accordingly, movements in the front-rear and left-right of the relay connection terminal 700 can be further restricted. This facilitates mounting of the relay connection terminal 700 during production, and eliminates an error of the mounting direction.

When the first external output terminal 500, the second external output terminal 600, and the relay connection terminals 700 are mounted to the terminal holder 400, a state is established in which the lead terminal connection parts 520, 620, 720 of the first external output terminal 500, the second external output terminal 600, and the relay connection terminals 700 are positioned near the pairs of terminal insertion holes 480.

The thicknesses of the first external output terminal 500 and the second external output terminal 600 are greater than, e.g., about two times, the thickness of the relay connection terminal 700. Accordingly, the strengths of the first external output terminal 500 and the second external output terminal 600 are increased. Therefore, when the first external output terminal 500 and the second external output terminal 600 have respectively corresponding external terminals fastened and fixed thereto by using the bolts 950, damages and the like are less likely to be caused in the first external output terminal 500 and the second external output terminal 600.

The terminal cover 800 includes: a cover body 810 which covers the terminal holder 400 and the circuit board 300 from above; and a front face plate 820 which extends downward from the front edge of the cover body 810 and which covers the terminal holder 400 and the circuit board 300 from front. The cover body 810 is configured such that: a rear portion in a right end portion is recessed inwardly so as not to cover the external connection terminal part 510 of the first external output terminal 500; a rear portion in a left end portion is recessed inwardly so as not to cover the external connection terminal part 610 of the second external output terminal 600; and a center portion in a front end portion is recessed inwardly so as not to cover the connector 302 of the circuit board 300. The front face plate 820 is not formed in the portion corresponding to the connector 302.

In the cover body 810, mounting tabs 830 each having an insertion hole 831 are provided in front portions of both of left and right end portions, and a mounting boss 840 having an insertion hole 841 is provided at the left end of a rear end portion of the cover body 810. On the upper face of the cover body 810, a plus sign 851 representing the polarity of the first external output terminal 500 is formed at a right end position, and a minus sign 852 representing the polarity of the second external output terminal 600 is formed at a left end position.

When the power storage module 1 is to be assembled, four power storage devices 100 are attached to the device holder 200, first. At this time, the angle in the circumferential direction of each power storage device 100 is adjusted such that the positions of the positive electrode lead terminal 140 and the negative electrode lead terminal 150 drawn from each power storage device 100 attached to the device holder 200 are aligned with the positions of a pair of through-holes 301 of the circuit board 300 attached to the device holder 200 and a pair of terminal insertion holes 480 of the terminal holder 400 attached to the device holder 200.

The double-sided adhesive tape 160 affixed to the peripheral face of each power storage device 100 is opposed to the front face of a corresponding accommodation part 210 of the device holder 200 in a state where the angle of the power storage device 100 is adjusted. When each power storage device 100 is accommodated in a corresponding accommodation part 210, the peripheral face of the power storage device 100 is opposed and close to the semicircular arc face 212 of the accommodation part 210, and the double-sided adhesive tape 160 affixed to the peripheral face of the power storage device 100 comes into close contact with the semicircular arc face 212. Accordingly, the semicircular arc face 212 i.e., the inner face 211, of the accommodation part 210 and the peripheral face of the power storage device 100 are bonded (adhered) by the double-sided adhesive tape 160.

Here, at the peripheral face of the power storage device 100, i.e., the peripheral face of the container 110, when the narrowed part 111 is formed through narrowing processing, upper and lower peripheral portions with respect to the narrowed part 111 are deformed, whereby the peripheral portions slightly bulge compared to the other portion of the peripheral face of the container 110. In a state where the power storage device 100 is accommodated in the accommodation part 210, the narrowed part 111 and the peripheral portions are opposed to the first region 211$a$. However, since the accommodation space S1 in the first region 211$a$ is larger than the accommodation space S2 in the second region 211$b$, the narrowed part 111 and the peripheral portions thereof are accommodated in the accommodation space S1. Accordingly, the peripheral face of the power storage device 100 can be inhibited from tilting with respect to the inner face 211 in the second region 211$b$, and the double-sided adhesive tape 160 can be reliably brought into close contact with the peripheral face of the power storage device 100 and the inner face 211 of the accommodation part 210.

Further, a peripheral face portion, of the power storage device 100, on the side opposite to the peripheral face portion that has been bonded to the inner face 211 of the accommodation part 210 is supported by the pairs of claw parts 215. Thus, movement of the power storage device 100 in a direction in which the power storage device 100 is detached from the accommodation part 210 is prevented. When the power storage device 100 is to be accommodated in the accommodation part 210, the pair of claw parts 215 are elastically deformed to be expanded outwardly by being pushed from the front by the peripheral face of the power storage device 100. Accordingly, the power storage device 100 can be passed through the pair of claw parts 215 to be accommodated in the accommodation part 210.

After each power storage device 100 has been attached, reinforcement of the device holder 200 by filling the elastic adhesive 250 is performed.

Figure 8A:
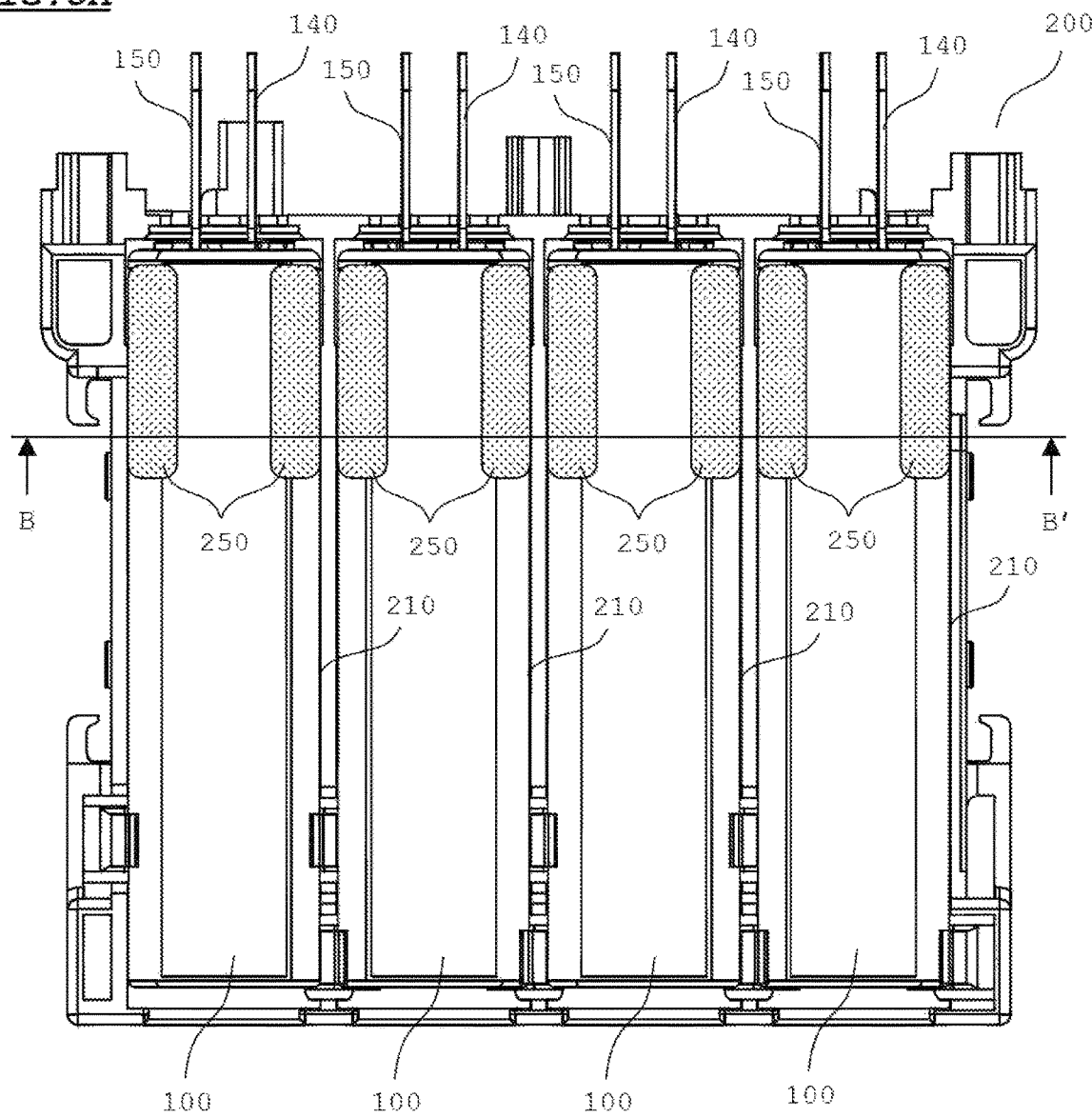
FIG. 8A is a front view of the device holder to which the power storage devices are attached and in which an elastic adhesive is filled, according to the embodiment.
Figure 8B:
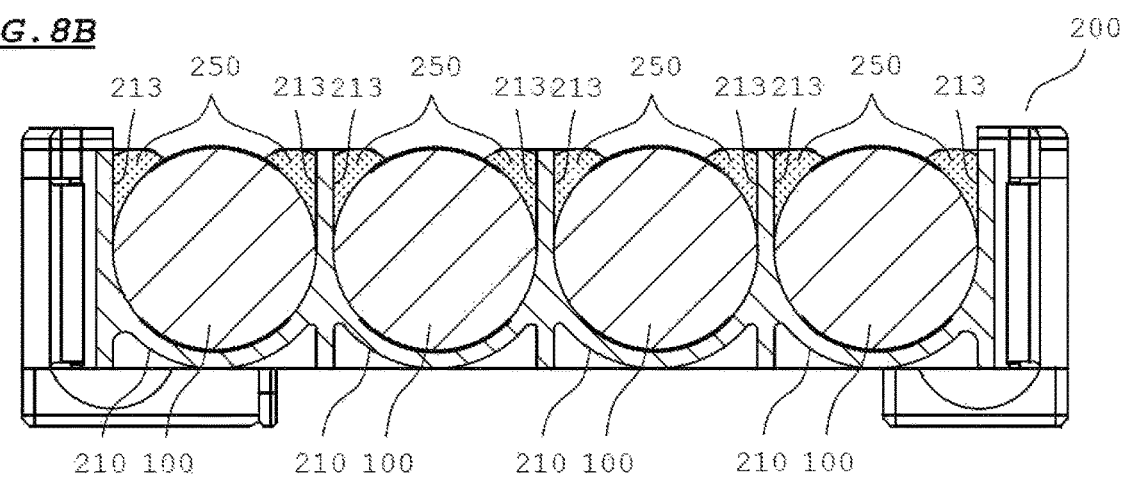
FIG. 8B is a B-B' cross-sectional view of FIG. 8A.

FIG. 8A is a front view of the device holder 200 to which the power storage devices 100 are attached and in which the elastic adhesive 250 is filled, according to the present embodiment. FIG. 8B is a B-B' cross-sectional view of FIG. 8A.

As shown in FIGS. 8A and 8B, in each accommodation part 210 of the device holder 200, the elastic adhesive 250 is filled in a clearance between each linear face 213 and the peripheral face on the upper end portion side with respect to the center in the axial direction of the power storage device 100. Specifically, the elastic adhesive 250 is filled in a predetermined length range including an upper end portion of the power storage device 100. The upper end portion of the power storage device 100 is the end portion where the positive electrode lead terminal 140 and the negative electrode lead terminal 150 are provided. Meanwhile, the elastic adhesive 250 is not filled in the clearance between each linear face 213 and the peripheral face on the lower end portion side with respect to the center in the axial direction of the power storage device 100. The lower end portion of the power storage device 100 is the end portion where the positive electrode lead terminal 140 and the negative electrode lead terminal 150 are not provided. The elastic adhesive 250 is filled up to the position of the front end of each accommodation part 210, and the elastic adhesives 250 on both sides of the power storage device 100 are not continuous with each other. Thus, a portion of the peripheral face of the power storage device 100 is exposed between the elastic adhesives 250 on both sides.

The elastic adhesive 250 is an epoxy modified silicone resin elastic adhesive, for example. The filled elastic adhesive 250 hardens at ordinary temperature, in a state of being adhered to the peripheral face of the power storage device 100 and the linear face 213. The hardened elastic adhesive 250 has elasticity. For example, the Young's modulus of the hardened elastic adhesive 250 is about 0.02.

Thus, the peripheral face of the power storage device 100 and the linear faces 213 on both sides of the peripheral face are coupled by the elastic adhesive 250, whereby reinforcement of the opening end side of each accommodation part 210 by using the power storage device 100 having high rigidity is performed on the upper end portion side, of the power storage device 100, where the positive electrode lead terminal 140 and the negative electrode lead terminal 150 are provided. Accordingly, the rigidity of the device holder 200 in the front-rear direction, i.e., the direction in which each accommodation part 210 is open, is increased on the upper end portion side of the power storage device 100. In addition, when some impact has been applied to the power storage module 1, i.e., the device holder 200, the impact is absorbed by the elasticity of the elastic adhesive 250. Thus, the elastic adhesive 250 is less likely to detach from the peripheral face of the power storage device 100 and the linear faces 213 of the accommodation part 210, and the coupled state of the peripheral face of the power storage device 100, the linear faces 213, and the elastic adhesive 250 is less likely to be broken.

When reinforcement of the device holder 200 has been completed, next, the circuit board 300 is fixed by the screws 910 to the mounting plate 220 of the device holder 200. At this time, the screws 910 are passed through the insertion holes 303 of the circuit board 300, to be fastened into the mounting holes 224. The positive electrode lead terminal 140 and the negative electrode lead terminal 150 of each power storage device 100 are passed through a corresponding pair of through-holes 301, and are electrically connected to the pair of through-holes 301 by soldering. Accordingly, the positive electrode lead terminal 140 and the negative electrode lead terminal 150 are electrically connected to the electronic circuit part of the circuit board 300. The circuit board 300 placed on the mounting plate 220 is in a state where the rear portions of both of left and right end portions of the circuit board 300 are substantially in contact with the ribs 222b on the inner side of the placement part 222. That is, the circuit board 300 is in a state of being sandwiched by the ribs 222b in the left-right direction. Accordingly, when the circuit board 300 are fastened and fixed to the mounting plate 220 by the screws 910, the circuit board 300 is less likely to be rotated and tilted on the mounting plate 220 due to the fastening torque.

Next, the terminal holder 400 to which the first external output terminal 500, the second external output terminal 600, and the three relay connection terminals 700 are attached is fixed to the mounting plate 220 of the device holder 200 by the screw 920. At this time, the mounting bosses 221 are received in the boss receiving parts 490 on the back side of the terminal holder 400, and the back side portion 440a of the first recessed portion 440 and the back side portion 450a of the second recessed portion 450 are placed on the placement parts 222, and are sandwiched by the ribs 222b from both sides. Accordingly, positioning in the front-rear and left-right directions of the terminal holder 400 is realized. In addition, the opening portion 449 of the first recessed portion 440 and the opening portion 459 of the second recessed portion 450 are aligned with the recessed portions 222a of the placement part 222. The screw 920 is passed through the third insertion hole 470 of the terminal holder 400, to be fastened into a corresponding mounting boss 221. The screws 940 are not yet fastened to the mounting bosses 221 on the right and left sides.

The positive electrode lead terminal 140 and the negative electrode lead terminal 150 of each power storage device 100 are passed through a corresponding pair of terminal insertion holes 480, and the leading end portions thereof extend upwardly from the surface (upper face) of the terminal holder 400. The connection faces 521, 621, 721 of the lead terminal connection parts 520, 620, 720 in the first external output terminal 500, the second external output terminal 600, and the relay connection terminals 700 extend along the extending direction of the leading end portions of the corresponding positive electrode lead terminals 140 and negative electrode lead terminals 150. Therefore, the projections 522, 622, 722 of the connection faces 521, 621, 721 are close to the leading end portions of the corresponding positive electrode lead terminals 140 and negative electrode lead terminals 150.

In this manner, as shown in FIG. 2, the power storage module 1 is assembled to be in a state before the terminal holder 400 and the circuit board 300 are covered by the terminal cover 800. Thereafter, by projection welding, the positive electrode lead terminals 140 and the negative electrode lead terminals 150 are connected and fixed to the corresponding lead terminal connection parts 520, 620, 720. The positive electrode lead terminals 140 and the negative electrode lead terminals 150 may be connected and fixed to the lead terminal connection parts 520, 620, 720 by welding other than projection welding, or by a bonding method other than welding.

Lastly, the terminal holder 400 and the circuit board 300 are covered by the terminal cover 800. A screw 940 is passed through the insertion hole 831 of the right mounting tab 830 of the terminal cover 800, the insertion hole 531 of the first fixation part 530 of the first external output terminal 500, and the first insertion hole 411 of the terminal holder 400, and then, the screw 940 is fastened to the mounting boss 221 at the right end of the mounting plate 220. Similarly, a screw 940 is passed through the insertion hole 831 of the left mounting tab 830 of the terminal cover 800, the insertion hole 631 of the first fixation part 630 of the second external output terminal 600, and the second insertion hole 421 of the terminal holder 400, and then, the screw 940 is fastened to the mounting boss 221 at the left end of the mounting plate 220. Accordingly, the terminal cover 800 is fixed to the terminal holder 400. In addition, both of left and right end portions of the terminal holder 400 are fixed to the mounting plate 220. Further, the first external output terminal 500 and the second external output terminal 600 are fixed to the terminal holder 400 also by the screw 920, in addition to the screws 930. The terminal cover 800 is also fixed to the mounting plate 220, by a screw 940 passed through the insertion hole 841 of the mounting boss 840 and fastened to the mounting boss 225.

In this manner, the power storage module 1 is completed as shown in FIG. 1. The external connection terminal part 510 of the first external output terminal 500, the external connection terminal part 610 of the second external output terminal 600, and the connector 302 of the circuit board 300 are not covered by the terminal cover 800, and are exposed to the outside. An external terminal on the positive electrode side from an external apparatus is connected to the external connection terminal part 510 by a bolt 950, and an external terminal on the negative electrode side from the external apparatus is connected to the external connection terminal part 610 by a bolt 950. At this time, the bolt 950 on the first external output terminal 500 side is passed through an insertion hole of the external terminal and the insertion hole 511 of the external connection terminal part 510 and fasten to the nut 460 on the right side. The bolt 950 on the second external output terminal 600 side is passed through an insertion hole of the external terminal and the insertion hole 611 of the external connection terminal part 610 and fastened to the nut 460 on the left side. Since the fastening is performed by using the bolts 950 and the nuts 460, the external output terminals 500, 600 and the external terminals can be firmly connected. When the bolt 950 is fastened to the nut 460, the leading end of the bolt 950 could protrude downwardly from the nut 460. In this case, the leading end of the bolt 950 is passed through the opening portion 449 of the first recessed portion 440 or the opening portion 459 of the second recessed portion 450, and is received in the recessed portion 222a of the placement part 222. Accordingly, the leading end of the bolt 950 can be prevented from coming into contact with the terminal holder 400 and damaging the terminal holder 400.

Figure 9A:
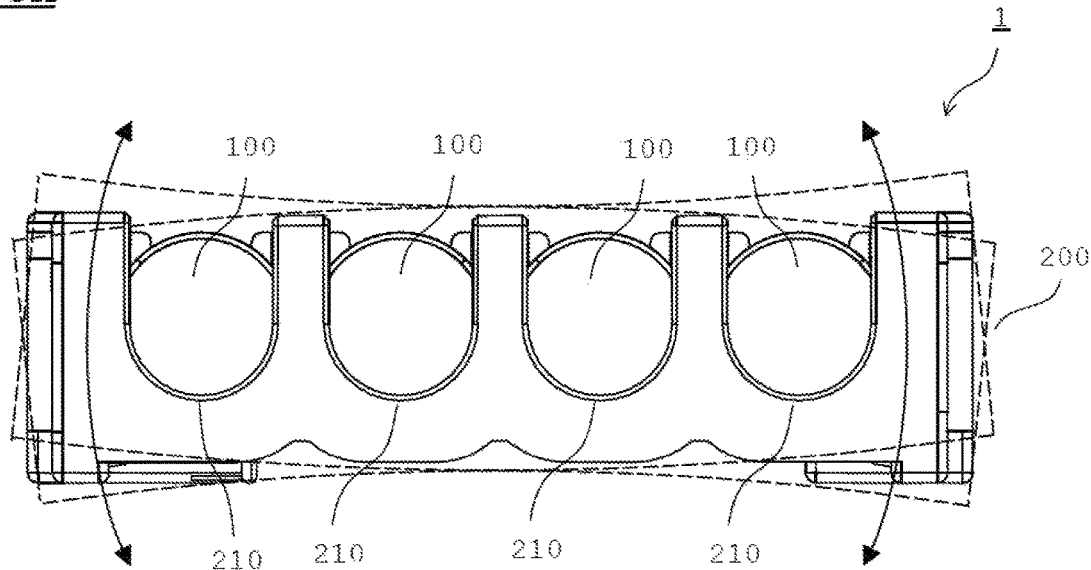
FIGS. 9A and 9B each show a state where vibration is applied the power storage module in which the device holder is not reinforced by filling of the elastic adhesive.
Figure 9B:
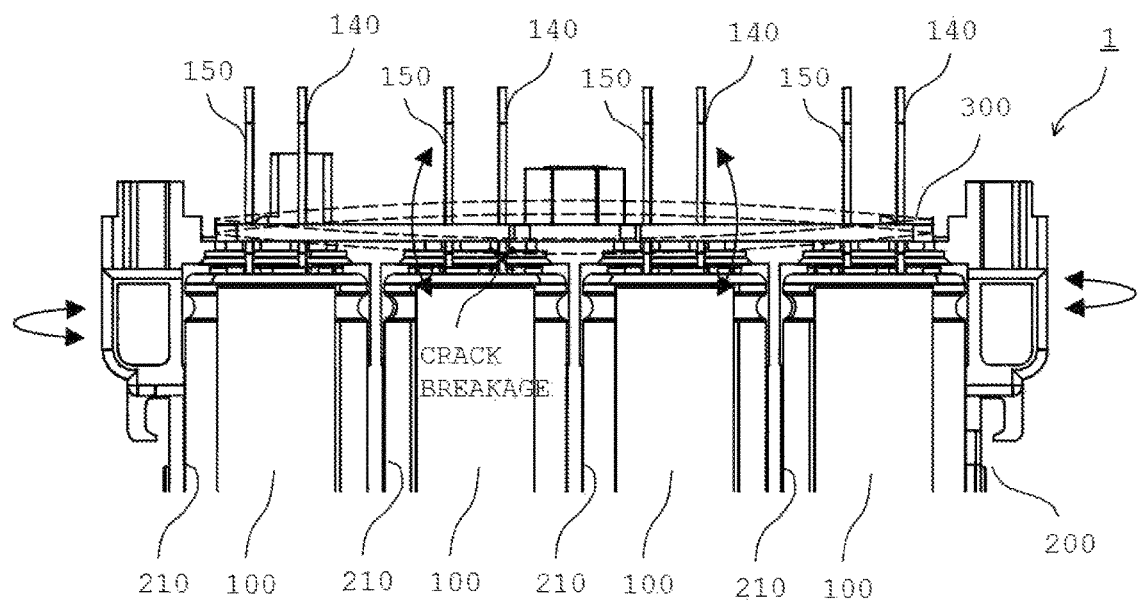

FIGS. 9A and 9B each show a state where vibration is applied to the power storage module 1 in which the device holder 200 is not reinforced by filling of the elastic adhesive 250. FIG. 9A is a bottom view of the power storage module 1, and FIG. 9B is a front view of an upper portion of the power storage module 1, without the components, such as the terminal holder 400, in the upper portion relative to the circuit board 300.

In the power storage module 1, the rigidity, of the device holder 200, on the side of the face having the opening end of each accommodation part 210 tends to be low. Thus, the rigidity of the device holder 200 in the direction parallel to the direction in which the accommodation part 210 is open, i.e., the front-rear direction, tends to be lower than the rigidities in the other directions (the up-down direction, the left-right direction). Therefore, when vibration in the front-rear direction is applied to the power storage module 1, in particular, when the power storage module 1 resonates due to the frequency of the vibration, the device holder 200 is easily deformed in the front-rear direction as shown in FIG. 9A.

In the power storage module 1, the circuit board 300 is joined to the device holder 200 such that the thickness direction of the circuit board 300 extends in the up-down direction. Therefore, the rigidity of the circuit board 300 is high in the front-rear direction in which the circuit board 300 has a certain width, and the rigidity in the up-down direction, which is the thickness direction of the circuit board 300, tends to be low. Therefore, when the device holder 200 has deformed in the front-rear direction, the circuit board 300 is easily deformed in the up-down direction, as shown in FIG. 9B. The positive electrode lead terminal 140 and the negative electrode lead terminal 150 of each power storage device 100 are connected to the circuit board 300. Therefore, when the device holder 200 and the circuit board 300 are deformed in this manner, stress is easily applied to the positive electrode lead terminal 140 and the negative electrode lead terminal 150. In particular, when the device holder 200 and the circuit board 300 are deformed in different directions, a large stress is easily applied to the positive electrode lead terminal 140 and the negative electrode lead terminal 150. Stress tends to be concentrated at the roots of the positive electrode lead terminal 140 and the negative electrode lead terminal 150. Thus, a crack, a breakage, or the like could be caused in the positive electrode lead terminal 140 and the negative electrode lead terminal 150.

In the present embodiment, the peripheral face of each power storage device 100 and the linear faces 213 on both sides of the peripheral face are coupled by the elastic adhesive 250. Accordingly, on the upper end portion side, of the power storage device 100, where the positive electrode lead terminal 140 and the negative electrode lead terminal 150 are provided, the rigidity of the device holder 200 in the front-rear direction, i.e., in the direction in which each accommodation part 210 is open, is increased. Thus, on the upper end portion side of the power storage device 100, deformation of the device holder 200 when the power storage module 1 vibrates in the front-rear direction can be suppressed. Accordingly, stress is less likely to be applied to the positive electrode lead terminal 140 and the negative electrode lead terminal 150, and thus, a crack, a breakage, or the like is less likely to be caused in these lead terminals 140, 150.

<Effects of Embodiment>

According to the present embodiment, the following effects can be exhibited.

In each accommodation part 210 of the device holder 200, the elastic adhesive 250 is filled in the clearance between each linear face 213 of the accommodation part 210 and the peripheral face of the power storage device 100, and each linear face 213 and the peripheral face of the power storage device 100 are coupled by the hardened elastic adhesive 250. Therefore, the rigidity, of the device holder 200, on the front face side where the rigidity tends to be low because of each accommodation part 210 being open, can be increased. Thus, deformation of the device holder 200 when the power storage module 1 vibrates in the front-rear direction can be suppressed.

The power storage module 1 is configured such that the positive electrode lead terminal 140 and the negative electrode lead terminal 150 of each power storage device 100 are connected to the circuit board 300 joined to the device holder 200. Meanwhile, the elastic adhesive 250 is filled in the clearance between each linear face 213 and the peripheral face on the upper end portion side with respect to the center in the axial direction of the power storage device 100. Accordingly, on the upper end portion side of the power storage device 100, the rigidity of the device holder 200 can be increased, and deformation of the device holder 200 when the power storage module 1 vibrates in the front-rear direction can be suppressed. Thus, stress is less likely to be applied to the positive electrode lead terminal 140 and the negative electrode lead terminal 150 provided in the upper end portion of the power storage device 100. Accordingly, a crack, a breakage, or the like is less likely to be caused in these lead terminals 140, 150.

In particular, since the circuit board 300 is joined to the device holder 200 such that the thickness direction of the circuit board 300 extends in the up-down direction, the circuit board 300 could be easily deformed in a direction different from that in the device holder 200. Therefore, a large stress could be easily applied to the positive electrode lead terminal 140 and the negative electrode lead terminal 150, and thus, a crack, a breakage, or the like could be more easily caused in these lead terminals 140, 150. According to the present embodiment, in such a configuration, deformation of the device holder 200 can be suppressed, and a crack, a breakage, or the like can be less likely to be caused in the positive electrode lead terminal 140 and the negative electrode lead terminal 150.

Further, the elastic adhesive 250 is not filled in the clearance between each linear face 213 and the peripheral face on the lower end portion side with respect to the center in the axial direction of the power storage device 100. Thus, the use amount of the elastic adhesive 250 can be reduced. Accordingly, increase in the weight of the entirety of the device holder 200 having the power storage devices 100 held therein and increase in the weight of the power storage module 1 can be suppressed. Thus, it is possible to suppress increase in the load that is caused when the power storage module 1 vibrates and that is applied to an external device to which the power storage module 1 is fixed. In addition, increase in the material cost can be suppressed.

Further, the elastic adhesive 250 has elasticity in a state where the elastic adhesive 250 has been hardened. Therefore, when some impact has been applied to the power storage module 1, i.e., the device holder 200, the impact can be absorbed by the elastic adhesive 250. Thus, the elastic adhesive 250 is less likely to be detached from the peripheral face of the power storage device 100 and the linear faces 213 of the accommodation part 210. Accordingly, a coupled state of the peripheral face of the power storage device 100, the linear face 213, and the elastic adhesive 250 is less likely to be broken, and the rigidity of the device holder 200 can be maintained.

Although an embodiment of the present invention has been described, the present invention is not limited to the above embodiment. Various application examples of the present invention can be made in addition to the above embodiment.

<Modification 1>

Figure 10A:
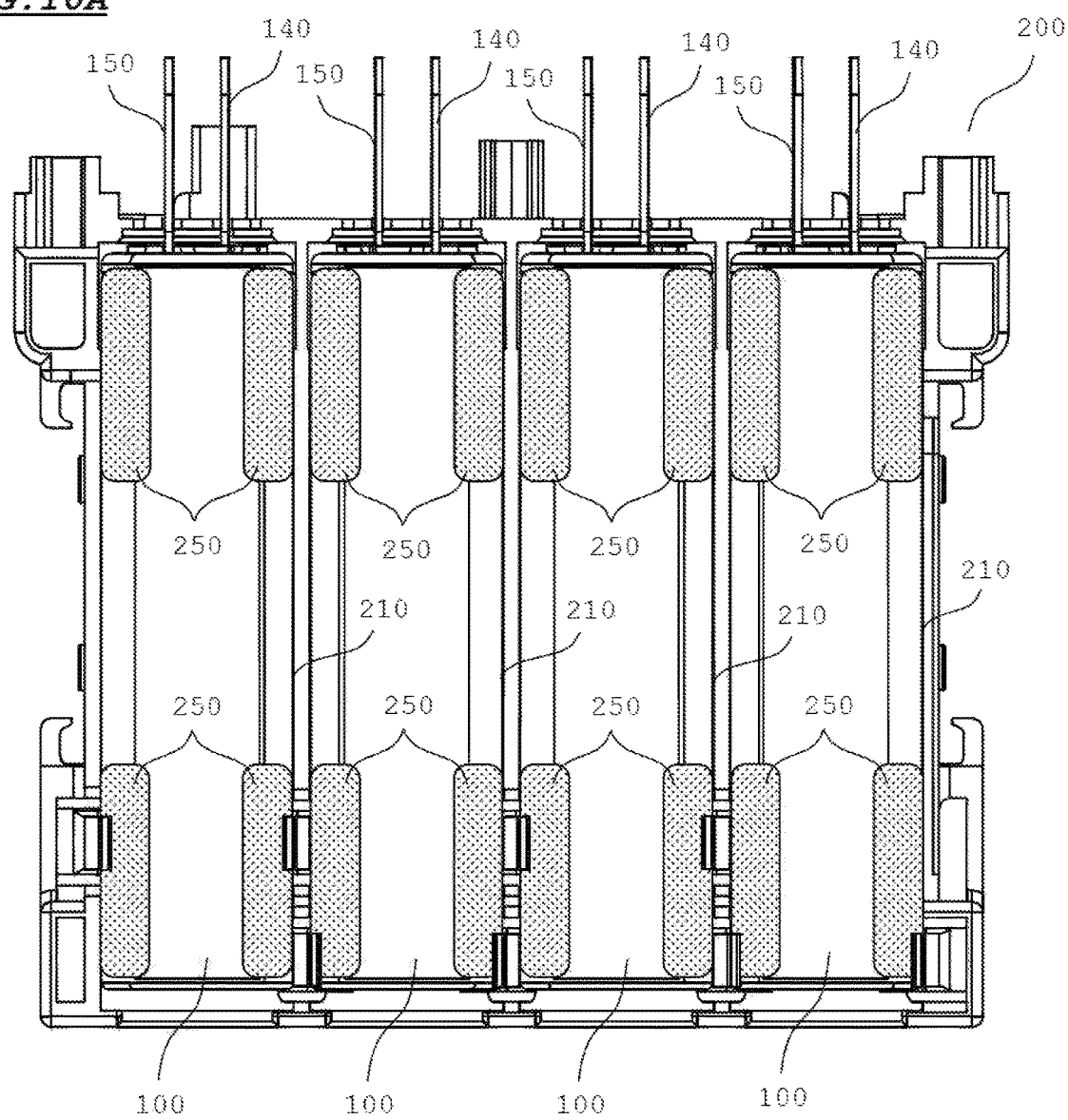
FIG. 10A is a front view of the device holder to which the power storage devices are attached and in which the elastic adhesive is filled, according to Modification 1.

In the above embodiment, a configuration is adopted in which the elastic adhesive 250 is filled in the clearance between each linear face 213 and the peripheral face on the upper end portion side with respect to the center in the axial direction in the power storage device 100, and the elastic adhesive 250 is not filled in the clearance between each linear face 213 and the peripheral face on the lower end portion side with respect to the center in the axial direction of the power storage device 100. However, as shown in FIG. 10A, a configuration may be adopted in which the elastic adhesive 250 is filled in the clearance between each linear face 213 and the peripheral face on the upper end portion side with respect to the center in the axial direction of the power storage device 100, and the elastic adhesive 250 is also filled in the clearance between each linear face 213 and the peripheral face on the lower end portion side with respect to the center in the axial direction of the power storage device 100. Specifically, the elastic adhesive 250 is filled in a predetermined length range including a lower end portion of the power storage device 100.

When this configuration is adopted, the rigidity of the device holder 200 can be increased also on the lower end portion side of the power storage device 100, and the overall rigidity of the device holder 200 is increased.

Figure 10B:
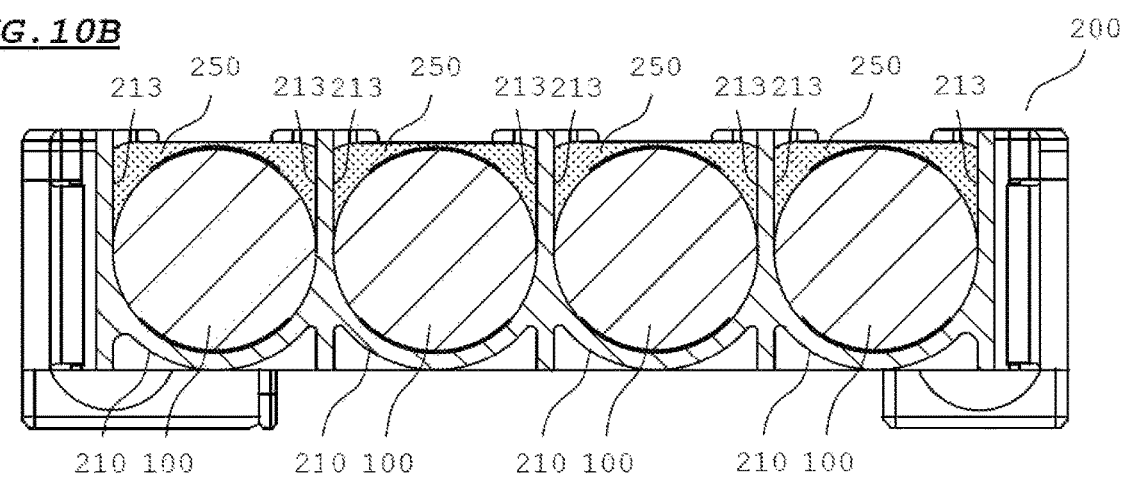
FIG. 10B is a cross-sectional view of the device holder to which the power storage devices are attached and in which the elastic adhesive is filled, according to Modification 1.

In the above embodiment, filling of the elastic adhesive 250 to the device holder 200 is performed such that: the elastic adhesives 250 on both sides of each power storage device 100 is not continuous with each other; and a portion of the peripheral face of the power storage device 100 is exposed between the elastic adhesives 250 on both sides. However, as shown in FIG. 10B, the following configuration may be adopted. That is, each accommodation part 210 is configured such that the linear faces 213 on both sides extend forward relative to the peripheral face of the power storage device 100, and filling of the elastic adhesive 250 to the device holder 200 is performed such that the elastic adhesives 250 on both sides of the power storage device 100 are continuous with each other, i.e., the entirety of the half-face of the peripheral face of the power storage device 100 is covered by the elastic adhesive 250 in the left-right direction.

When this configuration is adopted, the adhesion area of the elastic adhesive 250 to the peripheral face of the power storage device 100 and the linear faces 213 of the accommodation part 210 is increased, and the elastic adhesive 250 is less likely to be detached from the peripheral face of the power storage device 100 and the linear faces 213. In addition, the coupling force among the peripheral face of the power storage device 100, the linear faces 213, and the elastic adhesive 250 is increased, and the rigidity of the device holder 200 is further increased.

However, when the configuration shown in FIG. 10A or the configuration shown in FIG. 10B is adopted, the use amount of the elastic adhesive 250 is increased when compared to that in the above embodiment. Thus, these configurations are preferably adopted when it is necessary to further enhance the rigidity of the device holder 200 even with an increased use amount of the elastic adhesive 250.

In a configuration in which the elastic adhesive 250 is filled on both the upper side and the lower side of the device holder 200 as shown in FIG. 10A, filling of the elastic adhesive 250 as shown in FIG. 10B may be performed.

<Modification 2>

Figure 11:
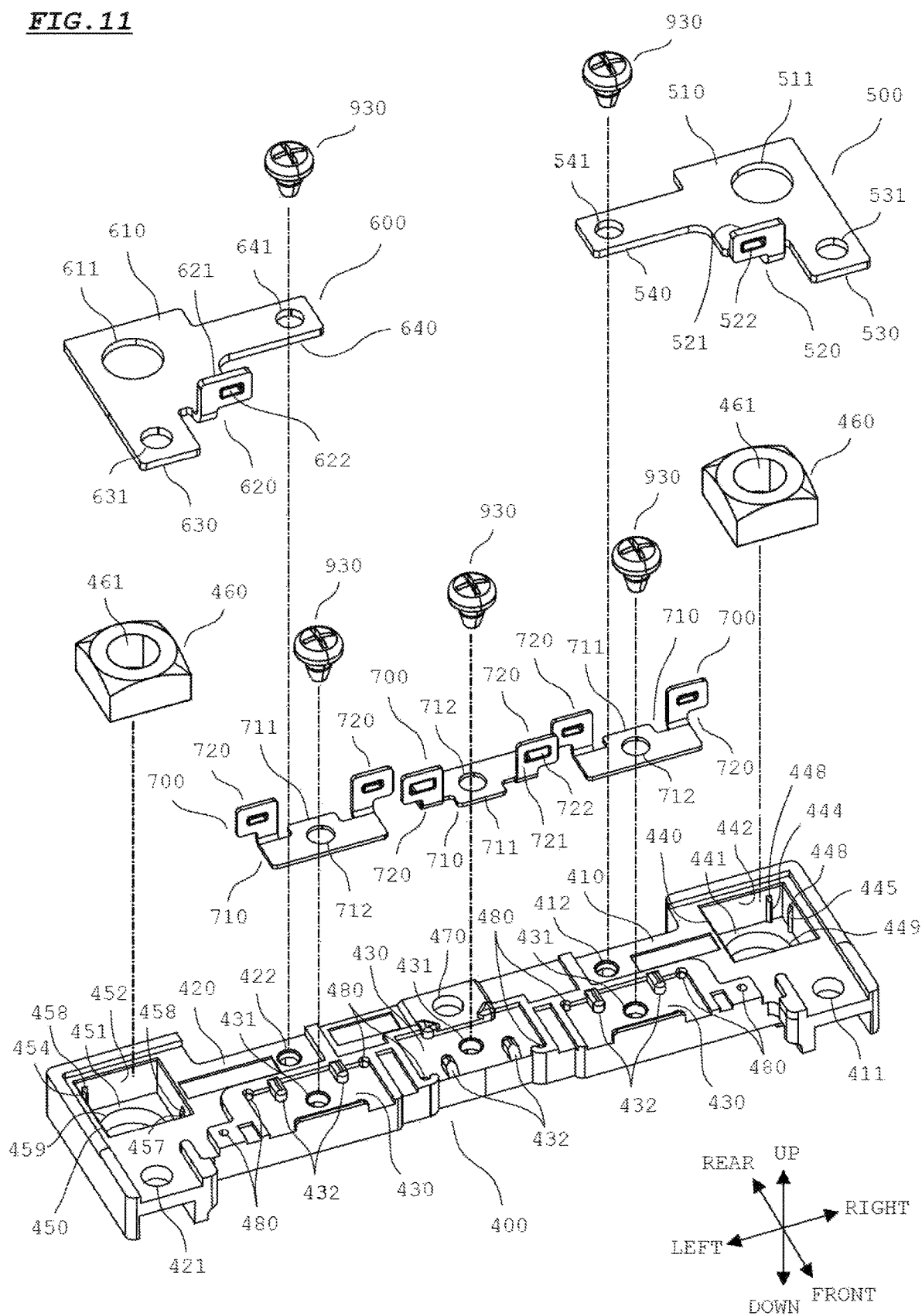
FIG. 11 is an exploded perspective view of the terminal holder, the first external output terminal, the second external output terminal, and the relay connection terminals, according to Modification 2.
Figure 13A:
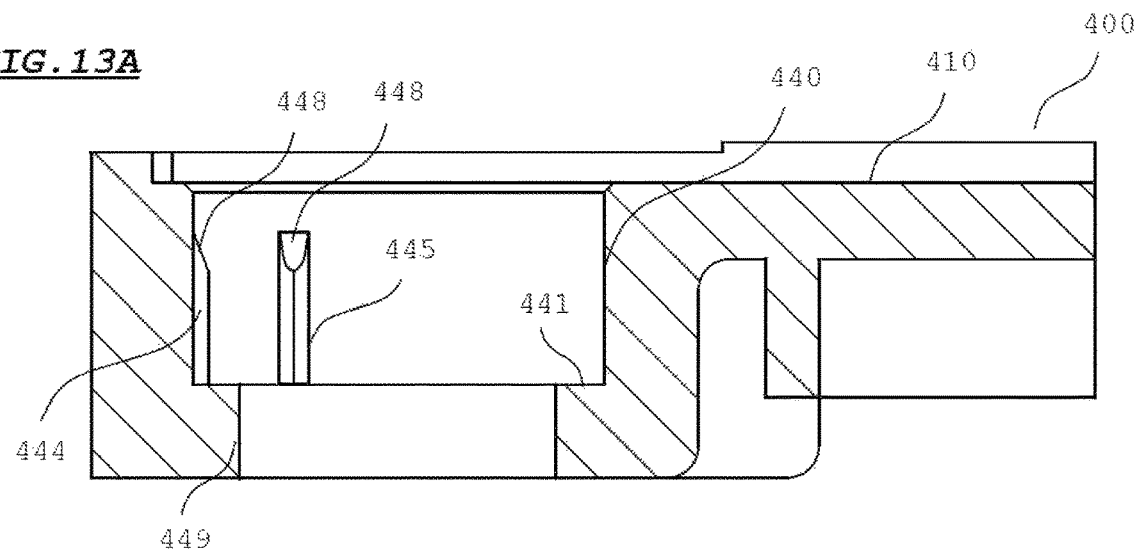
FIG. 13A is a cross-sectional view of the terminal holder along an A-A' line in FIG. 12, according to Modification 2.
Figure 13B:
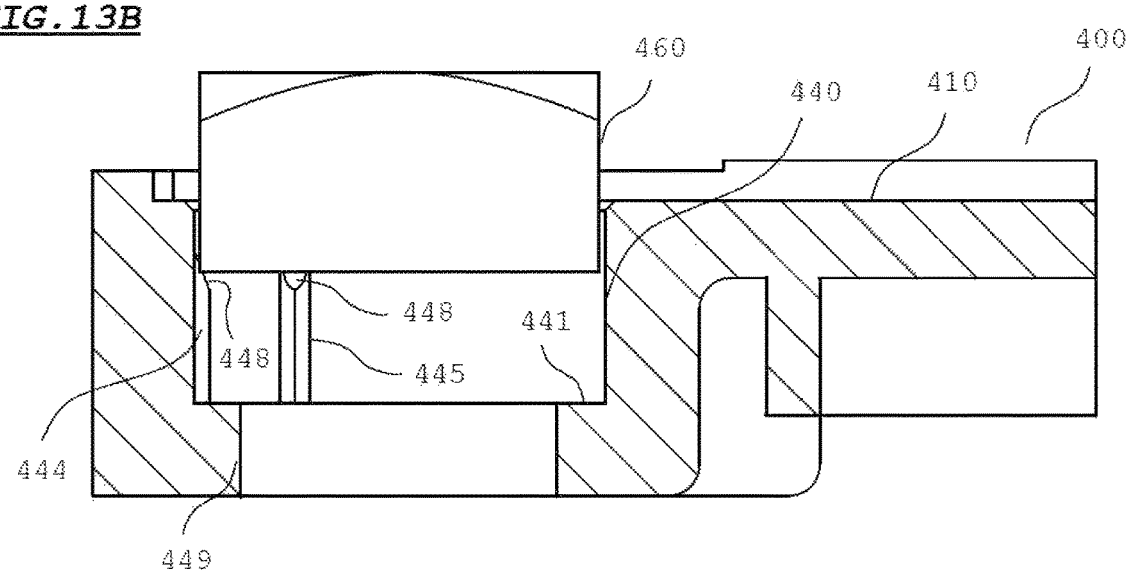
FIG. 13B is a cross-sectional view of the terminal holder along the A-A' line in FIG. 12 in a state where a lower portion of a nut is inserted in a first recessed portion, according to Modification 2.
Figure 13C:
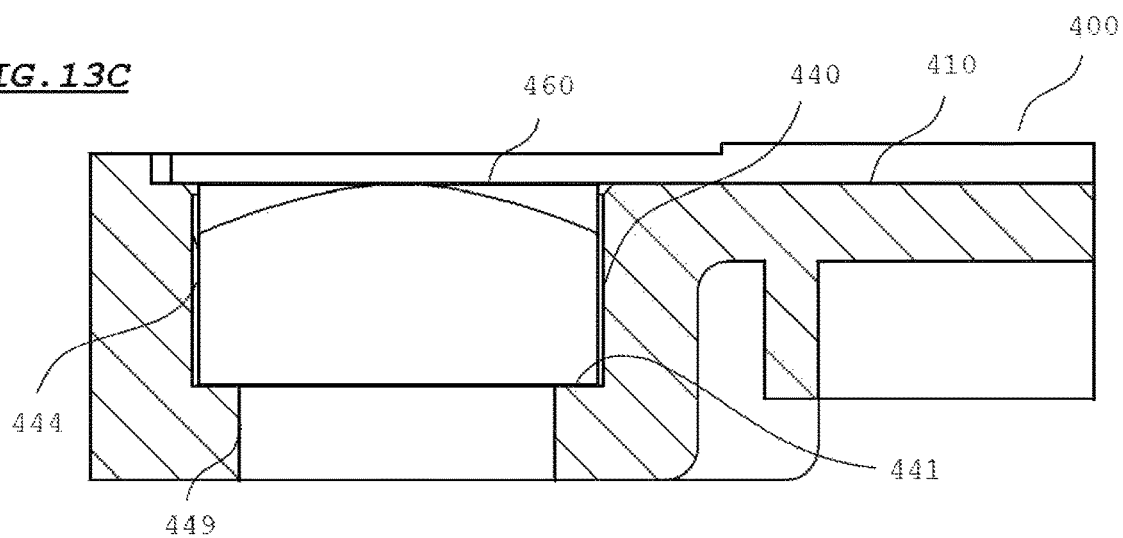
FIG. 13C is a cross-sectional view of the terminal holder along the A-A' line in FIG. 12 in a state where the nut is embedded in the first recessed portion, according to Modification 2.

FIG. 11 is an exploded perspective view of the terminal holder 400, the first external output terminal 500, the second external output terminal 600, and the relay connection terminals 700, according to Modification 2. FIG. 12 is a plan view of the terminal holder 400 with a center portion omitted, according to Modification 2. FIG. 13A is a cross-sectional view of the terminal holder 400 along the A-A' line in FIG. 12, according to Modification 2. FIG. 13B is a cross-sectional view of the terminal holder 400 along the A-A' line in FIG. 12 in a state where a lower portion of the nut 460 is inserted in the first recessed portion 440, according to Modification 2. FIG. 13C is a cross-sectional view of the terminal holder 400 along the A-A' line in FIG. 12 in a state where the nut 460 is embedded in the first recessed portion 440, according to Modification 2. In FIGS. 13B and 13C, only the terminal holder 400 is shown in a cross section.

In the present modification, the terminal holder 400 corresponds to "terminal attachment part" described in the claims. The first terminal mounting part 410 and the second terminal mounting part 420 correspond to "attachment region" described in the claims. The first insertion hole 411 and the second insertion hole 421 correspond to "fixation part" and "first fixation part" described in the claims. The first mounting hole 412 and the second mounting hole 422 correspond to "fixation part" and "second fixation part" described in the claims. The first recessed portion 440 and the second recessed portion 450 correspond to "recessed portion" described in the claims. First inner side wall faces 442a, 452a correspond to "first inner wall face" described in the claims. Second inner side wall faces 442b, 452b correspond to "second inner wall face" described in the claims. Third inner side wall faces 442c, 452c correspond to "third inner wall face" described in the claims. Fourth inner side wall faces 442d, 452d correspond to "fourth inner wall face" described in the claims. First corner portions 443a, 453a correspond to "first corner" described in the claims. Second corner portions 443b, 453b correspond to "second corner" described in the claims. Third corner portions 443c, 453c correspond to "third corner" described in the claims. Fourth corner portions 443d, 453d correspond to "fourth corner" described in the claims. First press-fit ribs 444, 454 correspond to "rib" and "first rib" described in the claims. Second press-fit ribs 445, 455 correspond to "rib" and "second rib" described in the claims. Third press-fit ribs 446, 456 correspond to "rib" and "third rib" described in the claims. Fourth press-fit ribs 447, 457 correspond to "rib" and "fourth rib" described in the claims. The first external output terminal 500 and the second external output terminal 600 correspond to "external output terminal" described in the claims.

With respect to the terminal holder 400, in the first terminal mounting part 410, the first recessed portion 440 is formed so as to be close to a corner portion 400a on the rear side of a right end portion of the terminal holder 400. In the second terminal mounting part 420, the second recessed portion 450 is formed so as to be close to a corner portion 400b on the rear side of a left end portion of the terminal holder 400. The nuts 460 are embedded in the first recessed portion 440 and the second recessed portion 450.

The first recessed portion 440 and the second recessed portion 450 include: inner bottom wall faces 441, 451 having substantially square shapes; and inner peripheral wall faces 442, 452 standing from the respective sides of the inner bottom wall faces 441, 451. The inner peripheral wall faces 442, 452 are wall faces parallel to the press-fitting direction (the up-down direction) of the nuts 460 into the first recessed portion 440 and the second recessed portion 450, and are formed by the first inner side wall faces 442a, 452a, the second inner side wall faces 442b, 452b, the third inner side wall faces 442c, 452c, and the fourth inner side wall faces 442d, 452d. The second inner side wall face 442b, 452b is opposed to the first inner side wall face 442a, 452a. The third inner side wall face 442c, 452c is orthogonal to the first inner side wall face 442a, 452a and the second inner side wall face 442b, 452b. The fourth inner side wall face 442d, 452d is opposed to the third inner side wall face 442c, 452c. The first corner portion 443a, 453a is formed between the first inner side wall face 442a, 452a and the third inner side wall face 442c, 452c. The second corner portion 443b, 453b is formed between the second inner side wall face 442b, 452b and the fourth inner side wall face 442d, 452d. The third corner portion 443c, 453c is formed between the first inner side wall face 442a, 452a and the fourth inner side wall face 442d, 452d. The fourth corner portion 443d, 453d is formed between the second inner side wall face 442b, 452b and the third inner side wall face 442c, 452c. In the first recessed portion 440, the first inner side wall face 442a and the third inner side wall face 442c are positioned on the corner portion 400a side at the rear of the right end portion of the terminal holder 400. In the second recessed portion 450, the first inner side wall face 452a and the third inner side wall face 452c are positioned on the corner portion 400b side at the rear of the left end portion of the terminal holder 400.

On the first inner side wall face 442a, 452a, the first press-fit rib 444, 454 extending in the press-fitting direction (the up-down direction) is formed at a position closer to the first corner portion 443a, 453a than to the third corner portion 443c, 453c. On the third inner side wall face 442c, 452c, the second press-fit rib 445, 455 extending in the press-fitting direction (the up-down direction) is formed at a position closer to the first corner portion 443a, 453a than to the fourth corner portion 443d, 453d. The distance from the first corner portion 443a, 453a to the first press-fit rib 444, 454, and the distance from the first corner portion 443a, 453a to the second press-fit rib 445, 455 are substantially equal to each other.

Similarly, on the second inner side wall face 442b, 452b, the third press-fit rib 446, 456 extending in the press-fitting direction (the up-down direction) is formed at a position closer to the second corner portion 443b, 453b than to the fourth corner portion 443d, 453d. On the fourth inner side wall face 442d, 452d, the fourth press-fit rib 447, 457 extending in the press-fitting direction (the up-down direction) is formed at a position closer to the second corner portion 443b, 453b than to the third corner portion 443c, 453c. The distance from the second corner portion 443b, 453b to the third press-fit rib 446, 456, and the distance from the second corner portion 443b, 453b to the fourth press-fit rib 447, 457 are substantially equal to each other.

Each press-fit rib 444 to 447, 454 to 457 is formed from a position, on the inner side wall face 442a to 442d, 452a to 452d (inner peripheral wall face 442, 452), that is lower than the end on the opening side, i.e., the upper end, of the recessed portion 440, 450, toward the inner bottom wall face 441, 451 (see FIG. 13A). In an upper end portion of each press-fit rib 444 to 447, 454 to 457, an inclined face 448, 458 extending downwardly toward the inner side of the corresponding recessed portion 440, 450.

The first recessed portion 440 and the second recessed portion 450 have tapered shapes such that the opening edges above the inner peripheral wall faces 442, 452 expand outwardly. In the first recessed portion 440 and the second recessed portion 450, circular opening portions 449, 459 are formed at center portions of the inner bottom wall faces 441, 451. The diameter of the opening portion 449, 459 is substantially equal to the diameter of the recessed portion 222a formed in the placement part 222 of the device holder 200.

A nut 460 is press-fitted into the first recessed portion 440 from above. At this time, as shown in FIG. 13B, first, a lower portion of the nut 460 is inserted into the first recessed portion 440. Then edge portion of the lower face of the nut 460 is guided by the inclined face 448 of each press-fit rib 444 to 447, and the center of the nut 460 and the center of the first recessed portion 440 are aligned with each other. Next, the nut 460 is pressed downwardly, and is press-fitted in a region on the inner side of the four press-fit ribs 444 to 447. The nut 460 moves downwardly while crushing each press-fit rib 444 to 447 outwardly, and reaches the inner bottom wall face 441. Accordingly, as shown in FIG. 13C, the nut 460 is embedded in the first recessed portion 440. The peripheral face of the nut 460 comes into contact with the first press-fit rib 444 and the second press-fit rib 445 at positions close to the first corner portion 443a, and comes into contact with the third press-fit rib 446 and the fourth press-fit rib 447 at positions close to the second corner portion 443b. The peripheral face of the nut 460 is pushed inwardly by the four press-fit ribs 444 to 447. Accordingly, between the nut 460 and the first recessed portion 440, holding force that holds the nut 460 in the first recessed portion 440 is generated in a direction perpendicular to the press-fitting direction of the nut 460. This holding force is biased to the first corner portion 443a side and the second corner portion 443b side, relative to the third corner portion 443c side and the fourth corner portion 443d side. That is, the holding force in the direction connecting the first corner portion 443a and the second corner portion 443b is greater than the holding force in the direction (the direction of an imaginary straight line L1) connecting the third corner portion 443c and the fourth corner portion 443d.

Similarly, a nut 460 is press-fitted from above into the second recessed portion 450 to be embedded therein. The peripheral face of the nut 460 comes into contact with the first press-fit rib 454 and the second press-fit rib 455 at positions close to the first corner portion 453a, and comes into contact with the third press-fit rib 456 and the fourth press-fit rib 457 at positions close to the second corner portion 453b. The peripheral face of the nut 460 is pushed inwardly by the four press-fit ribs 454 to 457. Accordingly, between the nut 460 and the second recessed portion 450, holding force that holds the nut 460 in the second recessed portion 450 is generated in a direction perpendicular to the press-fitting direction of the nut 460. This holding force is biased to the first corner portion 453a side and the second corner portion 453b side, relative to the third corner portion 453c side and the fourth corner portion 453d side. That is, the holding force in the direction connecting the first corner portion 453a and the second corner portion 453b is greater than the holding force in the direction (the direction of an imaginary straight line L2) connecting the third corner portion 453c and the fourth corner portion 453d.

In the first terminal mounting part 410, the first insertion hole 411 and the first mounting hole 412 are formed in a peripheral region, of the first recessed portion 440, that is far from the first corner portion 443a with respect to the imaginary straight line L1 connecting the third corner portion 443c and the fourth corner portion 443d of the first recessed portion 440. The first insertion hole 411 is provided in a direction (the front direction) orthogonal to the second inner side wall face 442b of the first recessed portion 440. The first mounting hole 412 is provided in a direction (the left direction) orthogonal to the fourth inner side wall face 442d of the first recessed portion 440.

Similarly, in the second terminal mounting part 420, the second insertion hole 421 and the second mounting hole 422 are formed in a peripheral region, of the second recessed portion 450, that is far from the first corner portion 453a with respect to the imaginary straight line L2 connecting the third corner portion 453c and the fourth corner portion 453d of the second recessed portion 450. The second insertion hole 421 is provided in a direction (the front direction) orthogonal to the second inner side wall face 452b of the second recessed portion 450. The second mounting hole 422 is provided in a direction (the right direction) orthogonal to the fourth inner side wall face 452d of the second recessed portion 450.

In the terminal holder 400, the nut 460 embedded in the first recessed portion 440 is covered by the first external output terminal 500, and is in a state of being pressed from above by the first external output terminal 500. The nut 460 embedded in the second recessed portion 450 is covered by the second external output terminal 600, and is in a state of being pressed from above by the second external output terminal 600.

The first external output terminal 500 is fixed by the screw 940, 930 at the positions of the first insertion hole 411 and the first mounting hole 412 formed in the peripheral region, of the first recessed portion 440, that is far from the first corner portion 443a with respect to the imaginary straight line L1 connecting the third corner portion 443c and the fourth corner portion 443d. Thus, on the first corner portion 443a side far from the fixing portions, the force with which the nut 460 is pressed by the first external output terminal 500 is weaker than that on the other corner portion 443b, 443c, 443d sides. However, in the present modification, the holding force that holds the nut 460 in the first recessed portion 440 is stronger on the first corner portion 443a side than that on the third corner portion 443c side and on the fourth corner portion 443d side. Therefore, even when vibration or the like has occurred in the power storage module 1, the nut 460 is less likely to be raised from inside the first recessed portion 440 on the first corner portion 443a side which is difficult to be pressed by the first external output terminal 500.

This also applies to the nut 460 embedded in the second recessed portion 450. Even when vibration or the like has occurred in the power storage module 1, the nut 460 is less likely to be raised from the inside of the second recessed portion 450, on the first corner portion 453a side which is difficult to be pressed by the second external output terminal 600.

<Effects of Modification 2>

As described above, according to the present modification, the inner peripheral wall face 442 (452) of the first recessed portion 440 (the second recessed portion 450) has formed thereon the first press-fit rib 444 (454), the second press-fit rib 445 (455), the third press-fit rib 446 (456), and the fourth press-fit rib 447 (457) which: extend in the press-fitting direction of the nut 460; and come into contact with the peripheral face of the nut 460 press-fitted in the first recessed portion 440 (the second recessed portion 450) to generate holding force that holds the nut 460 in the first recessed portion 440 (the second recessed portion 450). These press-fit ribs 444 to 447 (454 to 457) are disposed such that the holding force to the nut 460 is different depending on the portion of the nut 460. Specifically, the press-fit ribs 444 to 447 (454 to 457) are disposed in a positional relationship that allows increase in the holding force generated at a portion, of the nut 460, that has a small pressing force applied by the first external output terminal 500 (the second external output terminal 600) attached to the first terminal mounting part 410 (the second terminal mounting part 420). That is, according to the present modification, as for the first terminal mounting part 410 (the second terminal mounting part 420), the first insertion hole 411 (the second insertion hole 421) and the first mounting hole 412 (the second mounting hole 422) for fixing the first external output terminal 500 (the second external output terminal 600) to the terminal holder 400 are provided in a peripheral region, of the first recessed portion 440 (the second recessed portion 450), that is far from the first corner portion 443a (453a) with respect to the imaginary straight line L1 (L2) connecting the third corner portion 443c (453c) and the fourth corner portion 443d (453d). Meanwhile, the first press-fit rib 444 (454) and the second press-fit rib 445 (455) are formed on the first inner side wall face 442a (452a) and the third inner side wall face 442c (452c) such that the holding force in the direction connecting the first corner portion 443a (453a) and the second corner portion 443b (453b) is greater than the holding force in the direction connecting the third corner portion 443c (453c) and the fourth corner portion 443d (453d). More specifically, on the first inner side wall face 442a (452a), only the first press-fit rib 444 (454) is formed at a position closer to the first corner portion 443a (453a) than to the third corner portion 443c (453c). On the third inner side wall face 442c (452c), only the second press-fit rib 445 (455) is formed at a position closer to the first corner portion 443a (453a) than to the fourth corner portion 443d (453d).

Accordingly, even when vibration or the like has occurred in the power storage module 1, the nut 460 is less likely to be raised from the inside of the first recessed portion 440 (the second recessed portion 450), at a portion of the nut 460 difficult to be pressed by the first external output terminal 500 (the second external output terminal 600), i.e., the portion on the first corner portion 443a (453a) side. In addition, although, for press-fitting the nut 460, greater force is required in accordance with increase in the holding force, the holding force is not great more than necessary, at portions of the nut 460 that are easily pressed by the first external output terminal 500 (the second external output terminal 600), i.e., at portions on the third corner portion 443c (453c) side and the fourth corner portion 443d (453d) side. Therefore, as a whole, press-fitting the nut 460 into the first recessed portion 440 (the second recessed portion 450) is less likely to be difficult.

According to the present modification, the first recessed portion 440 (the second recessed portion 450) is positioned close to the corner portion 400a (400b) such that the first inner side wall face 442a (452a) and the third inner side wall face 442c (452c) are positioned on the corner portion 400a (400b) side of the terminal holder 400. Thus, other components, i.e., the three relay connection terminals 700, can be easily disposed in the terminal holder 400. According to the present modification, since the first recessed portion 440 (the second recessed portion 450) is disposed in this manner, even when, in the first terminal mounting part 410 (the second terminal mounting part 420), the first insertion hole 411 and the first mounting hole 412 are provided in a peripheral region, of the first recessed portion 440 (the second recessed portion 450), that is far from the first corner portion 443a (453a) with respect to the imaginary straight line L1 (L2) connecting the third corner portion 443c (453c) and the fourth corner portion 443d (453d), rising of the nut 460 from the inside of the first recessed portion 440 (the second recessed portion 450) will not cause much concern.

Further, according to the present modification, on the first inner side wall face 442a (452a) and the third inner side wall face 442c (452c), the first press-fit rib 444 (454) and the second press-fit rib 445 (455) are formed so as to be biased to the first corner portion 443a (453a) side. Meanwhile, on the second inner side wall face 442b (452b) and the fourth inner side wall face 442d (452d), the third press-fit rib 446 (456) and the fourth press-fit rib 447 (457) are formed so as to be biased to the second corner portion 443b (453b) side. Accordingly, the balance of forces necessary for press-fitting the nut 460 to the first recessed portion 440 (the second recessed portion 450) is maintained on the first corner portion 443a (453a) side and the second corner portion 443b (453b) side. Thus, the nut 460 is less likely to be press-fitted in a tilted manner in the first recessed portion 440 (the second recessed portion 450).

Further, according to the present modification, each press-fit rib 444 to 447 (454 to 457) is formed from a position, on the inner side wall face 442a to 442d (452a to 452d), that is lower than the end on the opening side, i.e., the upper end, of the first recessed portion 440 (the second recessed portion 450). Accordingly, before press-fitting is performed, if the lower portion of the nut 460 is caused to be received in the first recessed portion 440 (the second recessed portion 450), positioning of the nut 460 can be performed. This facilitates press-fitting of the nut 460 into the first recessed portion 440 (the second recessed portion 450).

Further, according to the present modification, in the first terminal mounting part 410 (the second terminal mounting part 420), the first insertion hole 411 (421) is provided in a direction orthogonal to the second inner side wall face 442b (452b), and the first mounting hole 412 (422) is provided in a direction orthogonal to the fourth inner side wall face 442d (452d). The first external output terminal 500 (the second external output terminal 600) is fixed to the terminal holder 400 at these positions. Accordingly, the nut 460 can be reliably pressed on the third corner portion 443c (453c) side and the fourth corner portion 443d (453d) side of the first recessed portion 440 (the second recessed portion 450).

<Other Modifications>

In the above embodiment, as an adhesive to be filled in each accommodation part 210 of the device holder 200, the elastic adhesive 250 which has elasticity in a hardened state is used. However, not limited thereto, an adhesive that does not have elasticity in a hardened state may be used.

In the above embodiment, the circuit board 300 is joined to the device holder 200 such that the thickness direction of the circuit board 300 extends in the up-down direction. However, the circuit board 300 may be joined to the device holder 200 such that the thickness direction of the circuit board 300 extends in the front-rear direction. For example, the circuit board 300 may be mounted to the rear face of the device holder 200 such that the region where the positive electrode lead terminal 140 and the negative electrode lead terminal 150 of each power storage device 100 are connected, protrudes upwardly from the device holder 200.

Further, in the above embodiment, four power storage devices 100 are used in the power storage module 1. However, not limited thereto, a different number of power storage devices 100 may be used in the power storage module 1. In addition, the power storage module 1 may be configured such that the plurality of power storage devices 100 are connected not in series but in parallel.

Further, in the above embodiment, the first external output terminal 500 serves as the output terminal on the positive electrode side, and the second external output terminal 600 serves as the output terminal on the negative electrode side. However, conversely, the first external output terminal 500 may serve as the output terminal on the negative electrode side, and the second external output terminal 600 may serve as the output terminal on the positive electrode side. In this case, each power storage device 100 is held in the device holder 200 such that the positive electrode lead terminal 140 and the negative electrode lead terminal 150 are set in a direction reverse to that in the above embodiment.

Further, in the above embodiment, the terminal holder 400 is provided as a separate body from the device holder 200, and is fixed to the device holder 200 by the screws 920, 940 to be integrated with the device holder 200. However, the device holder 200 and the terminal holder 400 may be integrally formed with each other.

Further, in Modification 2, on the first inner side wall face 442a (452a), only the first press-fit rib 444 (454) is formed at a position closer to the first corner portion 443a (453a) than to the third corner portion 443c (453c). On the third inner side wall face 442c (452c), only the second press-fit rib 445 (455) is formed at a position closer to the first corner portion 443a (453a) than to the fourth corner portion 443d (453d). However, as long as the first press-fit rib 444 (454) and the second press-fit rib 445 (455) are formed on the first inner side wall face 442a (452a) and the third inner side wall face 442c (452c) such that the holding force in the direction connecting the first corner portion 443a (453a) and the second corner portion 443b (453b) is greater than the holding force in the direction connecting the third corner portion 443c (453c) and the fourth corner portion 443d (453d), the following configurations may be adopted: for example, on the first inner side wall face 442a, two first press-fit ribs 444 (454) are formed (452a) at positions close to the first corner portion 443a (453a), and one press-fit rib is formed at a position close to the third corner portion 443c (453c); and on the third inner side wall face 442c (452c), two second press-fit ribs 445 (455) are formed at positions close to the first corner portion 443a (453a), and one press-fit rib is formed at a position close to the fourth corner portion 443d (453d). In this case, a configuration may be adopted in which, on the second inner side wall face 442b (452b), two third press-fit ribs 446 (456) are formed at positions close to the second corner portion 443b (453b), and one press-fit rib is formed at a position close to the fourth corner portion 443d (453d); and a configuration may be adopted in which, on the fourth inner side wall face 442d (452d), two fourth press-fit ribs 447 (457) are formed at positions close to the second corner portion 443b (453b) and one press-fit rib is formed at a position close to the third corner portion 443c (453c).

In Modification 2 above, two fixation holes, i.e., the first insertion hole 411 (the second insertion hole 421) and the first mounting hole 412 (the second mounting hole 422), are provided in the first terminal mounting part 410 (the second terminal mounting part 420). However, a configuration may be adopted in which one fixation hole is provided in the first terminal mounting part 410 (the second terminal mounting part 420). In this case, for example, one fixation hole may be provided near a line connecting the first corner portion 443a (453a) and the second corner portion 443b (453b).

Further, in Modification 2 above, the first external output terminal 500 (the second external output terminal 600) is fixed to the terminal holder 400 by a fixing method using the first insertion hole 411 (the second insertion hole 421) and a screw 940 and the first mounting hole 412 (the second mounting hole 422) and a screw 930. However, another fixing method may be used as the method for fixing the first external output terminal 500 (the second external output terminal 600) to the terminal holder 400.

Further, in Modification 2 above, the first recessed portion 440 and the second recessed portion 450 are respectively positioned close to the corner portion 400a at the right end and the corner portion 400b at the left end of the terminal holder 400. However, a configuration may be adopted in which the first recessed portion 440 and the second recessed portion 450 are not positioned close to the corner portions of the terminal holder 400.

Other than these, various changes can be made as appropriate to the embodiment of the present invention, within the scope of the technical idea described in claims.

In the description of the above embodiment, the terms that indicate directions such as "up" and "down" are relative directions that are dependent only on the relative positional relationship between component members, and do not indicate absolute directions such as the vertical direction and the horizontal direction.

INDUSTRIAL APPLICABILITY

The present invention is useful for power storage modules that are used in various types of electronic apparatuses, electric apparatuses, industrial apparatuses, electrical equipment for vehicles, and the like.

The invention claimed is:

1. A power storage module comprising:
a cylindrical power storage device; and
a holder in which the power storage device is held, wherein
the holder includes an accommodation part in which the power storage device is accommodated,
the accommodation part includes a first wall face having a semicircular arc shape, to which a peripheral face of the power storage device is opposed, and second wall faces each having a linear shape, each of the second wall faces being continuous with a respective one of ends of the first wall face and extending to an opening end of the accommodation part, and
the power storage module further comprises an adhesive filled, in the accommodation part, between the peripheral face of the power storage device and each second wall face, the adhesive being adhered to the peripheral face of the power storage device and the second wall face.

2. The power storage module according to claim 1, wherein
the adhesive has elasticity.

3. The power storage module according to claim 1, wherein
the power storage device includes a pair of lead terminals provided at one end portion of the power storage device and extending to outside,
the power storage module further comprises
a connection member configured to be joined to the holder, and have the pair of lead terminals fixed thereto, and
the adhesive is filled at least between each second wall face and the peripheral face on the one end portion side with respect to a center in an axial direction of the power storage device.

4. The power storage module according to claim 3, wherein
the adhesive is not filled between each second wall face and the peripheral face on another end portion side with respect to the center in the axial direction of the power storage device.

5. The power storage module according to claim 3, wherein
the adhesive is filled between each second wall face and the peripheral face on another end portion side with respect to the center in the axial direction of the power storage device.

6. The power storage module according to claim 3, wherein
the connection member includes a circuit board having an electronic circuit part, and
a thickness direction of the circuit board is different from a direction in which the accommodation part is open, and the circuit board is joined to the holder.

7. The power storage module according to claim 1, comprising the another cylindrical power storage device, wherein
the holder includes another accommodation part in which the another cylindrical power storage is accommodated.

8. A power storage module comprising:
a power storage device; and
a holder in which the power storage device is held, wherein
the holder includes an accommodation part in which the power storage device is accommodated,
the accommodation part includes a first wall face to which a peripheral face of the power storage device is opposed, and second wall faces each being continuous with a respective one of ends of the first wall face and each extending to an opening end of the accommodation part, and
the power storage module further comprises:
an adhesive filled, in the accommodation part, between the peripheral face of the power storage device and each second wall face, the adhesive being adhered to the peripheral face of the power storage device and each second wall face;
an external output terminal configured to output, to outside, electric power extracted from the power storage device;
a terminal attachment part to which the external output terminal is attached; and
a recessed portion provided in an attachment region, in the terminal attachment part, to which the external output terminal is attached, the recessed portion being configured to have a nut press-fitted therein,
the recessed portion includes a first inner wall face, a second inner wall face opposed to the first inner wall face, a third inner wall face crossing the first inner wall face and the second inner wall face, a fourth inner wall face opposed to the third inner wall face, a first corner formed between the first inner wall face and the third inner wall face, a second corner formed between the second inner wall face and the fourth inner wall face, a third corner formed between the first inner wall face and the fourth inner wall face, and a fourth corner formed between the second inner wall face and the third inner wall face,
each inner wall face has formed thereon a rib, the rib being configured to come into contact with a peripheral face of the nut press-fitted in the recessed portion, to generate holding force that holds the nut in the recessed portion, and
the first inner wall face and the third inner wall face each have formed thereon the rib such that the holding force in a direction connecting the first corner and the second corner is greater than the holding force in a direction connecting the third corner and the fourth corner.

9. The power storage module according to claim 8, wherein
in the attachment region, a fixation part configured to fix the external output terminal to the terminal attachment part is provided in a peripheral region, of the recessed portion, that is far from the first corner with respect to an imaginary straight line connecting the third corner and the fourth corner.

10. The power storage module according to claim 8, wherein
the rib extends in a press-fitting direction of the nut.

11. The power storage module according to claim 8, wherein
the first inner wall face, the second inner wall face, the third inner wall face, and the fourth inner wall face extend in parallel to a press-fitting direction of the nut.

12. The power storage module according to claim 8, wherein the terminal attachment part has a corner portion in an end portion thereof,
the recessed portion is positioned close to the corner portion such that the first inner wall face and the third inner wall face are positioned on the corner portion side.

13. The power storage module according to claim 8, wherein
in the recessed portion, the rib is formed, one by one, on each inner wall face,
the first inner wall face has formed thereon a first rib as the rib, at a position closer to the first corner than to the third corner, and
the third inner wall face has formed thereon a second rib as the rib, at a position closer to the first corner than to the fourth corner.

14. The power storage module according to claim 13, wherein
the second inner wall face has formed thereon a third rib as the rib, at a position closer to the second corner than to the fourth corner, and
the fourth inner wall face has formed thereon a fourth rib as the rib, at a position closer to the second corner than to the third corner.

15. The power storage module according to claim 8, wherein
the rib is formed from a position, on each inner wall face, that is lower than an end on an opening side of the recessed portion.

16. The power storage module according to claim 8, wherein
the fixation part includes a first fixation part provided in a direction orthogonal to the second inner wall face, and a second fixation part provided in a direction orthogonal to the fourth inner wall face.

17. A power storage module comprising:
a power storage device; and
a holder in which the power storage device is held, wherein
the holder includes an accommodation part in which the power storage device is accommodated,
the accommodation part includes a first wall face to which a peripheral face of the power storage device is opposed, and second wall faces each being continuous with a respective one of ends of the first wall face and extending to an opening end of the accommodation part, and
the power storage module further comprises:
an adhesive filled, in the accommodation part, between the peripheral face of the power storage device and each second wall face, the adhesive being adhered to the peripheral face of the power storage device and each second wall face;
an external output terminal configured to output, to outside, electric power extracted from the power storage device;
a terminal attachment part to which the external output terminal is attached; and
a recessed portion provided in an attachment region, in the terminal attachment part, to which the external output terminal is attached, the recessed portion being configured to have a nut press-fitted therein, wherein
the recessed portion includes an inner peripheral wall face,
the inner peripheral wall face has formed thereon a plurality of ribs, the ribs being configured to come into contact with a peripheral face of the nut press-fitted in the recessed portion, to generate holding force that holds the nut in the recessed portion, and the plurality of ribs are disposed such that holding force that holds the nut in the recessed portion differs depending on a portion of the nut.

18. The power storage module according to claim 1, further comprising:

an external output terminal configured to output, to outside, electric power extracted from the power storage device;

a terminal attachment part to which the external output terminal is attached; and a recessed portion provided in an attachment region, in the terminal attachment part, to which the external output terminal is attached, the recessed portion being configured to have a nut press-fitted therein, wherein the recessed portion includes a first inner wall face, a second inner wall face opposed to the first inner wall face, a third inner wall face crossing the first inner wall face and the second inner wall face, a fourth inner wall face opposed to the third inner wall face, a first corner formed between the first inner wall face and the third inner wall face, a second corner formed between the second inner wall face and the fourth inner wall face, a third corner formed between the first inner wall face and the fourth inner wall face, and a fourth corner formed between the second inner wall face and the third inner wall face, each inner wall face has formed thereon a rib, the rib being configured to come into contact with a peripheral face of the nut press-fitted in the recessed portion, the first inner wall face has formed thereon a first rib as the rib, at a position closer to the first corner than to the third corner, the third inner wall face has formed thereon a second rib as the rib, at a position closer to the first corner than to the fourth corner, the second inner wall face has formed thereon a third rib as the rib, at a position closer to the second corner than to the fourth corner, and the fourth inner wall face has formed thereon a fourth rib as the rib, at a position closer to the second corner than to the third corner.

19. The power storage module according to claim 18, wherein in the attachment region, a fixation part configured to fix the external output terminal to the terminal attachment part is provided in a peripheral region, of the recessed portion, that is far from the first corner with respect to an imaginary straight line connecting the third corner and the fourth corner.

* * * * *